US008020181B2

(12) United States Patent
Koplar et al.

(10) Patent No.: US 8,020,181 B2
(45) Date of Patent: Sep. 13, 2011

(54) INTERACTIVE OPTICAL CARDS AND OTHER HAND-HELD DEVICES WITH INCREASED CONNECTIVITY

(75) Inventors: Edward J. Koplar, St. Louis, MO (US);
Daniel A. Ciardullo, Rolla, MO (US)

(73) Assignee: Koplar Interactive Systems International, LLC, St. Louis, MO (US)

( * ) Notice: Subject to any disclaimer, the term of this patent is extended or adjusted under 35 U.S.C. 154(b) by 0 days.

(21) Appl. No.: 12/566,373

(22) Filed: Sep. 24, 2009

(65) Prior Publication Data

US 2010/0014869 A1    Jan. 21, 2010

Related U.S. Application Data

(60) Continuation of application No. 11/876,548, filed on Oct. 22, 2007, now Pat. No. 7,627,879, which is a division of application No. 09/489,373, filed on Jan. 21, 2000, now Pat. No. 7,296,282.

(60) Provisional application No. 60/151,840, filed on Sep. 1, 1999, provisional application No. 60/116,866, filed on Jan. 22, 1999.

(51) Int. Cl.
*H04N 7/16* (2011.01)
(52) U.S. Cl. .......................................... 725/23; 725/136
(58) Field of Classification Search .................. 725/23, 725/136
See application file for complete search history.

(56) References Cited

U.S. PATENT DOCUMENTS 7,627,879 B2 * 12/2009 Koplar et al. .................. 725/23
* cited by examiner

*Primary Examiner* — Dominic D Saltarelli
(74) *Attorney, Agent, or Firm* — Clise, Billion & Cyr, P.A.; Timothy Clise

(57) ABSTRACT

A system for deriving benefits from the reception and processing of composite video signals by a hand-held device, such as a smart card. Video signals are modulated with auxiliary data creating composite video signals. The composite video signals are then transmitted to and received by a hand-held device. The auxiliary data is then detected in the modulated video signal by circuitry of the hand-held device. The user receives benefits resulting from the reception of the auxiliary data.

23 Claims, 10 Drawing Sheets

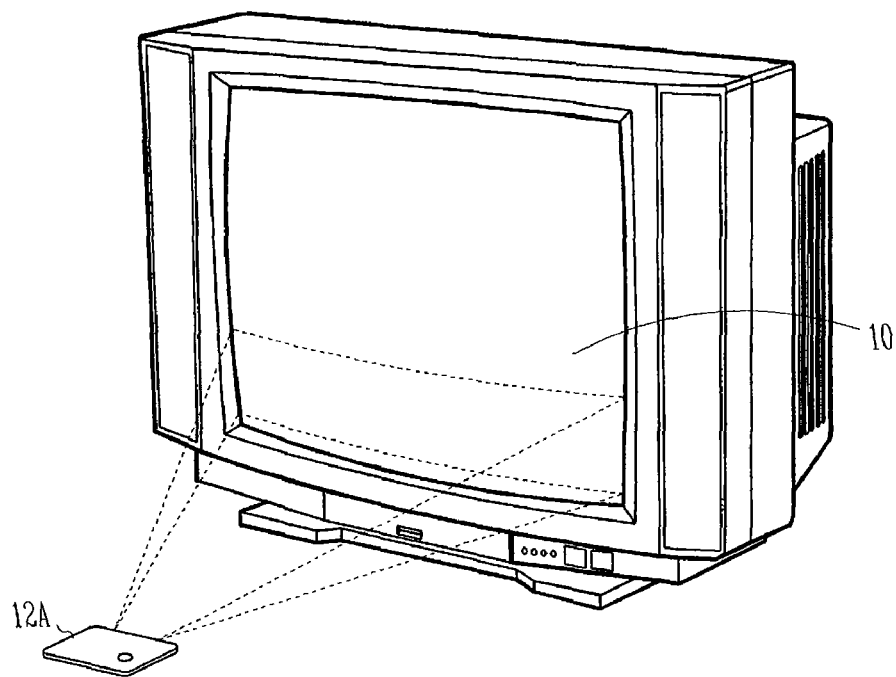
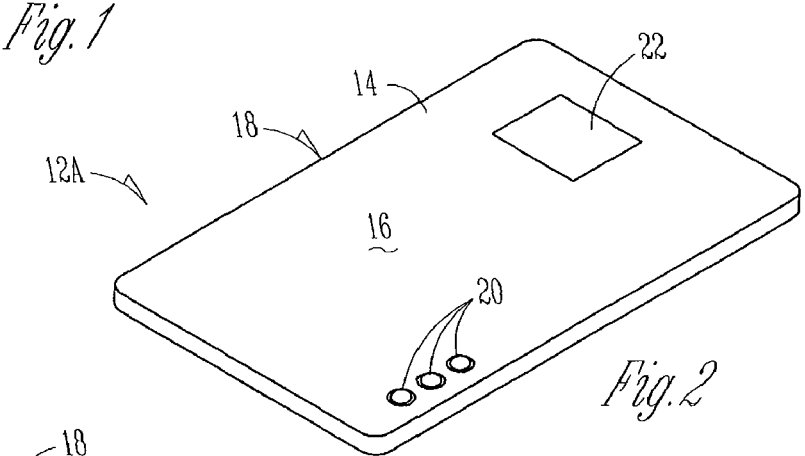
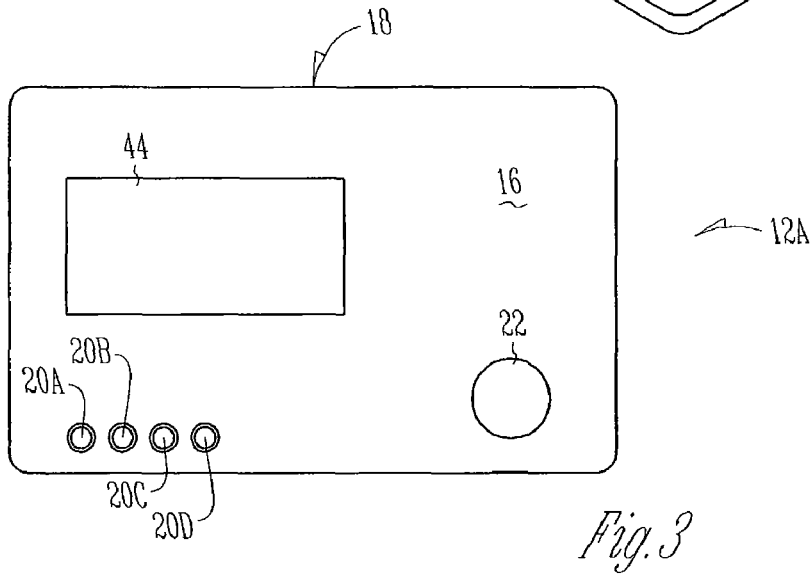

INTERACTIVE OPTICAL CARDS AND OTHER HAND-HELD DEVICES WITH INCREASED CONNECTIVITY

CROSS-REFERENCE TO RELATED APPLICATIONS

This application is a Continuation of U.S. application Ser. No. 11/876,548, which is a Division of U.S. Pat. No. 7,296,282, filed on Jan. 21, 2000, which claims priority to U.S. Provisional Patent Application No. 60/116,866, filed Jan. 22, 1999 and to U.S. Provisional Patent Application No. 60/151,840, filed Sep. 1, 1999, all of which are herein incorporated by reference.

BACKGROUND OF THE INVENTION

The present invention relates to interactive hand-held devices, and more particularly to methods and apparatuses for receiving and decoding modulated signals, for use by a hand-held devices and receiving benefits from receptions of the signals.

The hand-held devices receive modulated video signals for purposes including enjoyment, promotion, transfer of information, data collection, commercial verification, security, education, and transactions or verifications at points of sale, as well as other commercial, personal, entertainment, or amusement purposes. Data may be sent to the hand-held device by optical or electrical means. Data may be received by the hand-held device by utilizing a sleeve, cradle, or docking station; through an optical lens, by use of a PCMCIA or alternate computer port, or by FM, AM, or other radio frequency means. Use of the device may allow users to receive promotional opportunities and other information including access to hotel rooms and facilities.

U.S. Pat. No. 4,807,031 Broughton et al. ("Broughton") titled "Interactive Video Method and Apparatus" relates generally to in-band video broadcasting of commands and other encoded information to interactive devices. The invention described therein relates generally to interactive educational and entertainment systems, and is described in one embodiment in the context of television program control of toys located where there is a television receiver, as within a residence.

To encode control data capable of providing a benefit to a user, Broughton discloses a novel method of luminance or chrominance modulation of a video signal that creates a composite video signal, whereby the control data is created by modulating the video signal. The novel modulation method alternately raises and lowers the luminance/chrominance of adjacent horizontal scan lines to create a video subcarrier that contains the control data.

Under Broughton, the video signal is not being replaced with other data, nor is the data being added as a separate signal along with the video signal, rather, the video signal itself is modulated to subsequently create the control data. Therefore, the control data is a part of, or contained within, the video signal. The encoding method also includes preview and remove circuitry to ensure suitability or the presence of data encoding and removal of data encoding, respectively.

The control data is transmitted either by television broadcast means, or by pre-recorded video players that are connected to a video display. The control data is then received by the video display where a video field of the video display is modulated by control (i.e. auxiliary) data. The control data is then detected with either opto-electronic or RF (radio frequency) detection means that discriminate the program material from the control data. The detected control data is further reproduced such that the control data can be used with an interactive device.

A practical example of a device as described above is the commercially-sold hand-held game device for receiving and detecting such control data has been called the "Wheel of Fortune" ITV Play-Along Game, intended to be used at while viewing a television program presentation of the famous television show of the same name. The device, produced under license by the assignee of Broughton, was a palm-sized device and included a photosensor within a case of the device that received the video signals. The device then discriminated control data from the video program material and caused an LCD display device on the face panel of the toy to present portions of a word puzzle, allowing the holder of the device to play the game along with a contestant or to play in response to a videotaped presentation of the game. The "Wheel of Fortune" interactive television (ITV) game together with its hand-held control device including keyboard was commercially available in 1988.

An improvement on the method of modulation described in Broughton is described in U.S. Pat. No. 6,094,228 Ciardullo et al. In Ciardullo improved methods of modulation are disclosed. Data is inserted on the visual portion of a video signal by changing the luminance of paired lines in opposite directions, thus allowing allow larger amounts of data to be modulated in a signal. Broughton and Ciardullo are both incorporated by reference herein.

Efforts by others to provide hand-held devices capable of receiving transmission of modulated data from a video display are represented by U.S. Pat. Nos. 5,594,493; 5,761,601; 5,767,896, 5,907,350, and 5,953,047. Of these, U.S. Pat. No. 5,907,350 discloses a method for storing data on a so-called smart card, which is contended to receive, decode and store encoded data signals comprising redeemable coupons said to be embedded within television segments and transmitted along with normal television segments. The device of U.S. Pat. No. 5,907,350 is a hand-held unit that receives luminance signals from the television display in accordance with the principles of Broughton. The received video signals are decoded and stored within the card for future use. An LCD (liquid crystal display) readout enables Universal Price Codes ("UPC") corresponding to the stored data. A scanner reads the UPC codes at a redemption site, and the stored coupon is then erased from a memory of the card. A microprocessor channels the decoding and storage aspects, and a keypad allows use and input.

The term "smart card" as used in the above patents, connotes a hand-held, portable device, not conceptually different from the above-mentioned "Wheel of Fortune" ITV game device. However, the term does not only apply to those patents.

As a generic term, "smart card" gradually has come to mean a card that looks like a credit card but includes a microchip or microprocessor embedded or incorporated into the card. The smart card may be referred to as a "fingerheld" computer, typically including a data storage media ranging from less than a kilobyte up to a megabyte (if not more), and are said to have originated in France. Ognibene, P. J., *"Card Smarts,"* Technology Decisions (July, 1999). Smart cards may, according to a line of reference, also be called "chip cards."

For purposes of the present invention, the term "interactive card" means an interactive device of portable character, preferably of hand-held type which may be carried in the palm by a user, between fingers of the user, or is otherwise intended to be easily grasped and handled manually by the user, including credit card-like devices. To the extent that they are used in the present description relative only to inventions herein disclosed and/or claimed, the terms "hand-held device," "interactive device," "card," "interactive card," "smart card," "optical card," are used interchangeably.

The term "sponsor" is used herein in its broadest possible sense, and may include without limitation entities that issue the hand-held devices and entities that accept them or provide redemption services for users of the cards. Sponsors may also include health care and medical institutions and other service or eleemosynary organizations.

SUMMARY OF THE INVENTION

Among the several objects, features and advantages of the invention may be noted the provision of interactive hand-held devices for carrying out various modes of novel and commercially advantageous signaling, information-transferring, and value-indicating methods. The hand-held devices typically take the shape of a card or card-like device, are referred to throughout in this application as cards or smart cards. These hand-held devices react from the reception of auxiliary data from sources including radio transmissions, computer systems, video recordings, video transmissions or other sources for reproduction of video, audio and/or other data. Cards, which preferably contain optical detection and decoding means, respond to composite video signals, from a video display, comprising auxiliary data and continuous video program data. All video displays, whether a television set or monitor, television-like, or image-presenting display device capable of displaying an image containing a modulated video signal, may in the present specification be collectively referred to simply as "display devices."

Signals are received, detected, and reproduced by the new hand-held devices for various purposes including: enjoyment; promotion; coupon or prize validation; advertising by sponsors; advertising verification and polling; transfer of information; data collection; commercial verification; security and access; education; game playing; transactions, verifications, or redemption by sponsoring entities or related commercial locations at points of sale including the Internet; other commercial and non-commercial purposes.

Transmission of auxiliary data to the card is encoded using a system of video modulation, preferably as described in Broughton or Ciardullo, but alternatively by other known methods in the art including through the use of the vertical-blanking interval (VBI). The video signal is transmitted to the display device by means of a broadcast, cable, satellite or home video.

Other objects, features and advantages of the invention include:

A method of television interactive advertisement and promotion signal transmission using interactive hand-held devices in such a manner that both the mode of transmission of information and the display of received information and/or value indicative thereof will attract viewers' attention, stimulate viewers to watch a transmission (which may be commercial advertising), and effectively entice viewers to respond and take action in response to its reception, as well as achieving the foregoing usage purposes.

Thus, there is described herein a system which includes: A method of such signal transmission that is cost effective, brand efficient, and fun for users of the new interactive hand-held devices;

A method of such signal transmission using interactive hand-held devices which effectively increases customer awareness, retention, and differentiation of advertisers' messages and products;

A method of such signal transmission using video interactive hand-held devices which allows viewers of television (or video) presentations, including advertising, to directly interact with the devices (such as television receiver or display);

A method of such signal transmission using interactive hand-held devices that builds store (point-of-sale) traffic, fosters consumer loyalty, and gives viewers a reason to pay more attention to a company's products, services and advertising;

A method of such signal transmission using video interactive hand-held devices which allows viewers of television (or video) presentations, including advertising, to upload received information to a computer which displays and uses relevant Internet addresses, textual information or code, and other promotional information usable by a computer or computer-like device; and Interactive hand-held devices of the invention are intrinsically simple, effective and economical to make and distribute widely, and which are reliable and easy to use.

The following are merely illustrative of some of the advantages and objects which the new system provides: television advertising response determination; interactive advertising and promotions; attraction of viewers' attention; effectively increase consumer awareness and retention of commercial advertising, messages, announcements, promotions, and specific products and services; increased customer differentiation of products and services; stimulation of viewers to watch commercials; increase of store traffic in response to commercial messages; fostering of consumer loyalty; enhancement of viewer involvement in program content, including commercials; enhancement of viewer retention of the content of commercial and other messages; enhancement of the value of commercial messages; increased product/service sales; saving of advertising costs; acceleration of response time of customers following delivery of commercial messages; verification of contests and awards; enhancement of viewer retention of the related website domain names; reduction of barriers related to e-commerce opportunities; additional and sometimes instant rewards and information obtainable via the Internet. The uses and advantages are more fully developed in the following description.

Briefly, a system using interactive cards derives benefits from the reception of auxiliary data. Auxiliary data is encoded by modulation of a video signal, thereby creating a composite video signal consisting of auxiliary data and continuous video program data. The composite video signal is transmitted to and displayed by a display device.

The auxiliary data may be optically detected and extracted on the card. The user first positions the card so that the optical receiver of the card is capable of receiving video signals from the display device. The card, when actuated, begins receiving video signals. Circuitry on the card discriminates whether auxiliary data is present in the video signals (i.e., where the video signals received are composite video signals). If auxiliary data is present, the card reproduces the auxiliary data for use by the card.

The auxiliary data may also be detected and electronically extracted from the video signal by use of a decoder device. The decoder device has circuitry similar to the card, as it discriminates whether auxiliary data is present in the video signal. However, electronic wire transfer of data is faster than the optical transmission and reception data can be transmitted faster. The decoder device can be connected to the VCR, connected to an RF antennae, integrated into part of the circuitry of the television, or otherwise be connected so that the decoder device can receive the video stream. The auxiliary data, when present, is transmitted from the decoder to the card. Transmission to the card can occur through various methods, including IR, RF, and a computer interface such as a PCMCIA port.

Among the several methods herein described may be noted a method of video interactive advertising and promotion, comprising normal television programming content modulated to contain auxiliary data, where the auxiliary data is associated with a sponsor and carries information of special significance relative to the sponsor and of special value to television viewers, distributing interactive devices of handheld character to television viewers for their use and convenience, the devices being capable of selectively receiving auxiliary data or receiving and decoding composite video signals, providing incentives for viewers to use the interactive devices for obtaining the auxiliary data by rewarding the viewers with information of special value, the interactive devices being capable of retaining indication of having received the information, and providing redemption of the special value for users at a redemption site where users may present the interactive devices.

When auxiliary data is reproduced by use of the card, various possible signals, indications, display readouts, or other interactive events provide the user with a benefit according to content of the auxiliary data. For example, a series of electroluminescent (EL) indicators may operate in sequence to signify coupon value. A liquid crystal display (LCD) readout or other visual displaying device may present information to the user or give notice of value received. Bonus points may be collected and retained on the device. Text, code, or other data may be transferred to a connected computer for which information may be displayed or executed on that computer. In a use of the device in conjunction with a sports presentation, users may receive on the card's alphanumeric display current sports statistics, including exemplarity, a batter's batting statistics. In a use of the device in conjunction with a car racing presentation, users may receive on the card's alphanumeric display the lap data, position, speed of a race participant, or other statistics from a racing event. Such statistics may be delivered in real time or delayed. In use of the device in conjunction with a hotel access card, additional access to rooms and facilities may then be available for the user, of which an indication may appear on the LCD.

The card may have additional capabilities, the use of which may be preprogrammed or programmed via user input. Such capabilities may include demographic or user information, which may be used in various applications of the card by a user or sponsor of the card. The card may also be used to make or facilitate purchases of items.

The exterior design of the card, containing indicia of recognized athletes, teams, products or other figures, and the collection of data located on the card entice users to save, collect, and trade the cards, such as in a rotisserie league. The devices may simulate other hand-held objects, such as a snapshot-type cameras, replica sports helmets, or scaled racing cars.

Another feature of the present invention is the optional computer interface. Thus the hand-held device, which may resemble a PCMCIA type computer card, contains means to connect to the Internet such as by use of a computer-compatible interface, which for convenience may be referred to as a computer-interface card. Television viewers, upon watching commercials, programs, or movies, can use the card to obtain opportunities for e-commerce or informational purposes. The information is then transferred to computers or computer-like devices where it can be used for informational or promotional opportunities. For example, a talk show may have a discussion about endangered animals. Informational or promotional opportunities such as available books or videos relating to those animals, along with information relating to how viewers can learn more information from a given Internet website are transmitted in composite video signals and may be received by a hand-held device.

The opportunities are transmitted with the composite video signal, and are preferably optically detected and reproduced by the hand-held device, and then transmitted to a computer by an interface. However, the auxiliary data may also be electrically detected by a decoder device, transferred to the card and discriminated, and then transferred again to a computer via an interface. Alternatively, received composite video signals may be transmitted from the hand-held device to a computer by an interface, where the auxiliary data is discriminated and the opportunities are then detected and reproduced by the computer. By any of the methods described herein, the opportunities once available to the computer can be stored and used, such as for e-commerce or information collection.

When appropriately connected, the stored information from the computer-interface card is uploaded (when appropriate) to a computer for processing and fulfillment. The information received by the computer includes a web page, Internet address or Uniform Resource Locator ("URL"), Hypertext Markup Language ("HTML") or similar textual information or code that can be displayed to or executed for a user. This information provides a means for the user to obtain benefits through interactivity, and for the sponsor to provide promotional information to the user.

Various other methods of the invention are set forth in the following description and claims. Similarly, other objects and features will be apparent or are pointed out more particular herein below.

BRIEF DESCRIPTION OF DRAWINGS

FIG. 1 is a perspective view schematically illustrating use of any of several embodiments of an interactive card in accordance with and embodying the present invention.

FIG. 2 is a perspective external view of a first embodiment of an interactive card in accordance with and embodying the present invention.

FIG. 3 is an external view of a second embodiment of an interactive card of the invention.

Corresponding reference characters identify corresponding elements throughout the several views of the drawings.

DESCRIPTION OF INVENTIVE EMBODIMENTS

Figure 4:
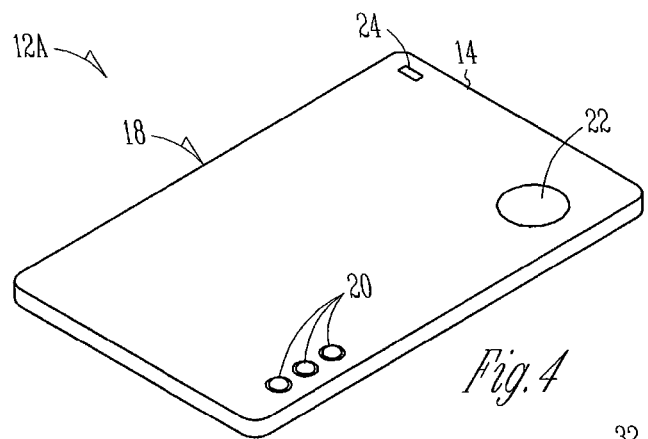
FIG. 4 is a perspective external view of another embodiment of an interactive card of the invention.

Referring to FIGS. 1-3, in a system of the invention, and in accordance with the various methods herein described, composite video signals are received and projected by a display device 10, to be received by a first embodiment of an interactive hand-held card-like device of the invention 12A. Display device 10 is representative of a television screen, video monitor or other video display, movie screen, computer monitor, video-converted display or video-like display, capable of receiving analog or digital video or video-representative signals from a suitable source, such as a television transmitter, a videotape, streaming video servers, a Digital Versatile Disc ("DVD"), or the computerized display representation of such a source of image content. For present purposes, however, it will be assumed that display device 10 is a kinescope or other conventional type of television display or monitor (which may, of course, include multiple or single-beam types of projector displays).

Thus, display device 10 may schematically represent a video display for displaying video signals but may alternatively be any sort of electron gun, active array or passive array display device capable of providing not only imaged information in a visible mode but also auxiliary information (e.g., data) in a substantially transparent mode. The display device further be characterized as a computer monitor or display, as well as a portion or window of such display device. Video signals include those delivered by microwave relay, satellite retransmission or cable, streaming and other types of downloadable or viewable computer video presentations, and those generally made available by wired or wireless methods.

The new interactive hand-held device 12A may be in the form of a card and can be referred to as a smart card, I.C. card, an interactive card, or optical card. Card 12A may be held in the palm or between the fingers of a user in the generally vicinity of television display 10, typically within the same room and suitably oriented, so that the card can receive light from a visual representation of the video signal from the display device. Card 12A, when alternatively configured to receive other signals including IR and RF transmissions from alternate devices, such as the decoder device, should be suitably oriented or connected to receive the auxiliary data or other signals from such a device.

Card 12A is depicted in FIG. 2 in a manner in which it may be held and used. The card includes a credit card or wallet-card-sized housing 14 that encloses various circuits and circuit components ("Circuitry") of the device. Card 12A may be thicker than a credit card as desired or as needed to contain within the enclosure 14 circuitry for carrying out functions as described below. Enclosure 14 may be of any hand-held shape desired that is functional and hand manipulable, examples of which include a PCMCIA card, snapshot-type camera, replica sports helmet, or scaled racing car.

On the front surface 16 of card 12A is an imprinted brand name of a sponsor, and possibly information or indicia that may induce a user to associate card 12A with a particular sponsor. Sponsors can include various entities such as advertisers, Internet websites, television shows, other occurrences, programs or events, for which use of the card will provide interactive opportunities. The sponsor may (alternatively or additionally) be a company providing the card to a user of its service, such as a hotel or place of business that uses the card for access, privileges, and/or rewards.

A leading edge 18 of the card may include a lens or small aperture 36 to admit video signals to a photosensor within enclosure 14, as is described herein below. Visible from face 16 of the card are a plurality of light-emitting devices 20 which may be light-admitting diodes (LEDs) or other electro luminescent light sources, including, for example, regions of a LCD of either active or passive type. The cards have various users controls and may include a keypad or touch screen to allow user input for specific functions and additional uses.

A typical manner in which the card is used and the lights are operated is as follows: A user watches a television presentation such as a commercial, television program, movie, or other video-displayed program. When such a presentation is displayed, the user may then hold the card as in FIG. 2. The user positions the card so that the leading edge 18 of the card will be in a position for receiving video signals from display device 10. The card or display device may have indicia informing the viewer to press the pressure membrane or button 22 at a preferred time, such as when a commercial of a sponsoring entity appears. Although the term "button" is used herein, it is considered to include membrane switches, pressure or touch regions capable of activation and carrying out the function of a button. When the user presses button 22, the video signal will be detected and received by a photodetector (the process to be described below) within enclosure 14. The composite video signal comprises a video signal modulated with auxiliary data, in accordance with the teaching of the above-referenced Broughton and/or Ciardullo each of which are herein incorporated by reference. A discriminator, implemented by circuitry of the card, determines whether auxiliary data has been transmitted along with the video signal of the presentation.

Alternatively, the received video signals may be sent through an interface (to be described below) of the card to a computer or computer-like device where the discrimination of auxiliary data may be implemented in the computer's hardware or software. As a further alternative, the video signals can be electrically detected and received by a decoder device, which will then discriminate the auxiliary data and transfer it to the card.

If the discriminator determines that the transmitted video signals contain auxiliary data, the circuitry of the card 12A may then (additionally or alternatively to the aiming light 24) cause an audio transducer 34 present on the printed circuit board to sound a tone or "beep", providing assurance that the auxiliary data has been received satisfactorily. A suitable aperture may be provided on the front or rear surface of the card to allow sound to pass from the transducer.

The circuitry of the card may also cause operation of one or more of lights 20 to indicate a value (whether it be a discount, prize, coupon, or item) that has been received. For example, one light may entitle the user to a free beverage at a sponsor's store location. Two lights may indicate a substantially larger coupon value, such as a twelve-pack of a beverage. A coupon value causing three lights 20 to be illuminated may indicate entitlement to a grand prize, such as a free supply of a beverage for the lifetime of the user. The term "light" is intended to mean any kind of display useful for conveying a signaling or indicating purpose visible to the user.

It is also possible to use the card display lights in alternative methods to confer benefits from reception of auxiliary data. For example, different colored lights may be used, with each color representing a different prize or different value. Alternatively, the card may be programmed to operate so that a light 20 shows each time a different commercial of a sponsoring entity is shown, so the user will have inducement to watch multiple commercials to be entitled to a prize or benefit.

Referring to FIG. 2, an external view of a further embodiment of the card 12A' is shown. It includes signal lights 20a, 20b, 20c and 20d in a sequenced array. The card and its lights 20a-20d operates in the following manner:

During a commercial or at the appropriate time, a user pushes button 22 to receive video signals by a preconfigured card. If the appropriate auxiliary data was present in the received video signal, the card then validates the receipt of the auxiliary data by illuminating a first light 20a. During a further commercial a second light 20b illuminates. During a third commercial a third light 20c illuminates, and during a fourth commercial presentation, light 20d illuminates. The user may then appropriately present the card at a vendor location, redemption center, or Internet website to determine if the card is one for which a special prize is to be awarded. If the card does not entitle the user to the special prize card, a consolation or alternative prize can be made available. A different variation of illumination of signal lights 20a-20d may entitle the user to alternate consolation or other prize.

Alternatively, the lights may work in the following manner: During each quarter of play, when a commercial appears the user may press button 22. When auxiliary data has been successfully received (by the process of which is described above) from the commercial sponsor of the card, the first light 20a will be illuminated to indicate receipt of the commercial during the first quarter. Such operation will continue through successive quarters until all lights are illuminated. The user may then present the card to a store or point of sale operated by the commercial sponsor to receive a prize or grand prize, depending upon the configuration of the card. Or, the user may be rewarded in accordance with how many lights are illuminated. Then, the user may thereafter tender the card for value redemption, or may present it, for example, at a lottery at which the cards may identify the user's name by users, and where the winning card is drawn.

The store location, point of sale, or sponsor's website may include means for resetting the card so that it may be used again during another presentation. Such means may include leaving indicia of a previous award reception on the card, such that a user may only redeem their benefit a limited number of times or for a limited duration. The card may have a code on the back such that a redemption center can verify that the receiver of the benefits of the card was in fact entitled to receive them and that the card has not been modified to receive an unauthorized benefit.

It will be appreciated from the foregoing that viewers using the interactive cards may be induced to watch a presentation that they might otherwise not be so inclined.

The inducement can span a series of commercials, causing users to watch presentation after presentation, as during successive days or weeks. Also, advertisers can make a better determination as to who has been watching and paying attention to their commercials. When users return the card to the benefit redemption center, advertisers will have knowledge of how many people actually took advantage of the promotion. The cards not only induce the viewer to watch a commercial, but also induce viewers to visit a sponsor's place of business, point of sale, or Internet website at which they may receive the value indicated by the card indicated by the lights or a code displayed by the LCD of the card.

Another example of use of the card is as follows: On a television broadcast, the announcer discloses last minute air fare specials indicating available flight times and cost. The video signals are modulated to contained auxiliary data with flight information.

Interested users capture the auxiliary data containing their selected flight opportunity. After receiving the data, users connect their card to a computer with Internet access to access the airlines Internet website verifying the availability, the cost, the flight information, and the restrictions and completing their purchase. If the card has wireless Internet access, the purchase can be made immediately or subject to confirmation on the card's LCD screen. Or, users can be required to arrive at the airport on a first come first served basis to complete their purchase and take their flight.

There are various incentives for a user to watch a sponsor's televised presentations including commercials, which include amusement or information of value to the user. For example, during each quarter of a game, a user would view commercials to obtain an indication of participation by means of lights 20a-20d during the successive quarters. The user knows they can take the card to a point of sale operated by the sponsor and receive a prize for having watched. Common advertising strategy for sponsors of major sport events, such as "bowl" games, is to provide a presentation during each quarter of the game.

During nationally-televised "super" events such as the well-known Super Bowl, World Series and "bowl" games, increased viewer ratings induce advertisers to provide impressive commercials to which users will not only pay attention but will also interact, watch, participate, and be favorably impressed by such commercials. The new cards, when used during such televised presentations, offer advertising sponsors an unparalleled opportunity for promotional activity and for assuring audience participation, as well as providing an exceedingly effective methodology and device by which the percentage of successful viewer watching and product/service interest can be measured.

Multiple advertisers can use the new card for either the same event or for multiple events. For example, if a commercial is presented during a television show relative to a first sponsor's product or service (such as relating to automobiles) with which there is relation to a second sponsor (such as bank providing financing for the sale of those automobiles) the card may be especially adapted by its resident instruction set to be "co-branded," so as to respond to both sponsor's presentations. The co-branded card may be used to provide special inducement such as through a prize or other value upon presentation at a bank, a dealer, or Internet website affiliated with or sponsoring the commercial presentations. Many other co-branding possibilities for the cards and their usage will be evident.

FIG. 4 illustrates features of the cards 12A or 12A', including the provision of aiming light 24 on the face of the card. The aiming light is preferably included on embodiments of the card where video signals are optically received by the card, such as to indicate that the card is positioned such that it is capable of capturing video signals emanating from a display device. When button 22 is pressed while the leading edge 18 of the card is generally oriented toward the display device, received composite video signals cause illumination of aiming light 24 to indicate that video signals are being received. The light illuminates for so long as data is being received, or for a predetermined period of time, sufficient to indicate that the card is oriented or aimed correctly for a long enough time period as to enable the encoded optical signals to be received by the card.

Figure 5:
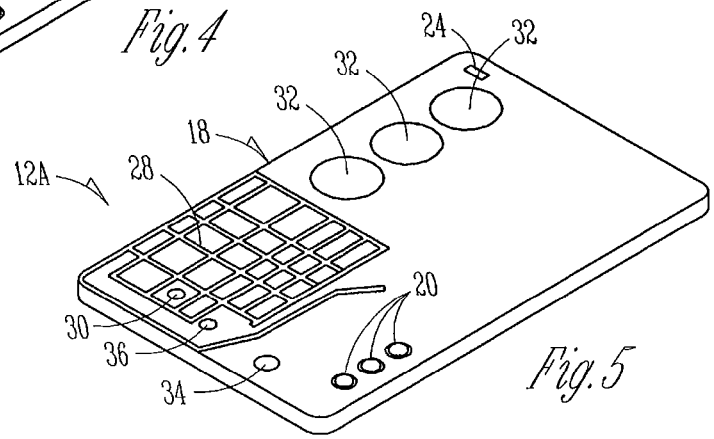
FIG. 5 is a perspective view of internal features of the interactive device of FIG. 4 of the embodiment of FIG. 4 showing an interactive card of the invention.

Referring to FIG. 5, the internal features of cards versions 12A and 12A' are illustrated. They may be seen to include a printed circuit board 26 having integrated circuits 28 including push-button 22 and aiming light 24, which may for example be a LED. The circuit board includes at an appropriate location, an optional photocell 30. Photocell 30 is appropriately oriented so that it may receive light through a suitable aperture (not shown) along the upper edge 18 of the card, which aperture may be at a location 36 as shown in FIG. 3. The circuit is powered by one or more batteries 32 or other suitable cells, intended to provide sufficient power for operation of the card for days, weeks, months, or years. The batteries may (alternatively or additionally) be used with other similar sources of portable power, such as solar cells.

Three lights 20 are shown present on the circuit board, and they make take the form of LEDs. However, as will be understood from study of FIG. 14 the circuit may include provision for more than three such lights. For example, it may include circuits for energizing up to nine LEDs.

Figure 6:
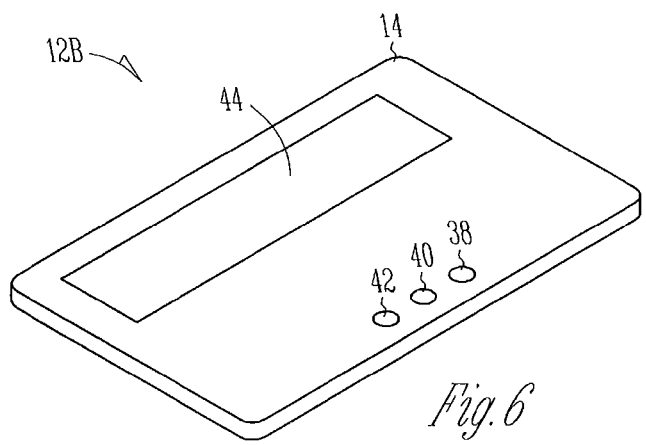
FIG. 6 is a perspective external view of another embodiment of an interactive card of the invention.

Referring now to FIG. 6, an embodiment 12B of the new card devices is shown including the provision for text display in lieu of the LED signal lights 20. LCD display 44 may be 16 digits, but less or more display capability may be provided, based on need and usage.

Card version 12B has an on-button 38 which when depressed will initiate operation of an LCD display 44 to display a coupon, a prize notification, or other information indicating receipt by the card of auxiliary data. For example, display 44 may used to display a first coupon in a circularly linked list of offers. On-button 38 may also held to initiate receiving video signals, or may be used for other display or control purposes separately from button 22. Scroll button 40 allows a user to traverse, i.e. scroll, information retained or received by the card, for example, the circularly linked list of offers received and stored on the card.

Expiration button 42, at any time while viewing an offer, when pressed displays the expiration date of the coupon value and when released shows the original offer again, or alternatively switches between the different displays. Expiration button 42 may (additionally or alternatively) display the date of card's expiration, after which card 12 will no longer function. Card 12 may be reused until expiration, and such reuse may include watching various games during a season, watching all quarters or periods of play, and watching appropriate commercials.

As a further alternative, expiration button 42 when depressed or depressed in conjunction with other buttons may additionally display data information about where the card was issued to the user, where the user lives, a serial number, and other data that a sponsor may desire. The displayed data may also identify the card holder and may have a number, personal identification number, or other data personal to the holder, such as residential address.

Accordingly, when the card is used at a redemption center, such as a point of sale, Internet website, or restaurant operated by or on behalf of a sponsor, a benefit may be received by the user. Information about the user, based on data stored on the card, is then made available to the sponsor, merchant or other seller of product or service. In that way, the sponsor, merchant or other seller of product or service may learn about their customers, possibly adding the user's name or address or additional information about the customer to a customer base.

Offers received by the card may be indicated not just by illuminating the light signals 20, but (additionally or alternatively) by textual information displayed on the LCD display. Auxiliary data may contain offers which includes instructions or identification of the redemption location. The text may otherwise identify the product or discount or other coupon to be redeemed by the user. For example, the card may be used in a mode in which the card receives composite video signals which triggers preprogrammed offers that already exist in a linked list stored in the card.

After watching a commercial, auxiliary data causes the card's preprogrammed textual information to indicate a product, discount, or other coupon available until an expiration date. The card, upon receipt of auxiliary data, retrieves the textual information and makes the offer available to the user. Alternatively, the textual information may be received by the card during use and then decoded and displayed on the LCD display as well as being added to the linked list.

The new card is useful to store multiple offers. Multiple offers can be from the same sponsor or different sponsors. The received offers may be valid for certain different amounts and for varying periods or dates. The cards may also be able to store previously received offers so as to indicate that a user will not be able to reuse them, as for example in the case of a prize or other one-time benefit.

Items displayed on the LCD are coupons which provide offers, coupon values, validation for discounts or other user benefits, such as prize merchandise identification or location for redemption. When the card is taken by the user to a redemption site, such as to the sponsor, merchant or other seller of product or service center, items stored in the card may be cleared by an authorized procedure at the redemption location, but alternatively the stored items or coupons may be reused until an expiration date. The coupons may contain the date the commercial originally ran, or the date the coupon was received by the card. In other words, the auxiliary may have an encoded date stamp, or the card may date stamp the information received. The date information may inform merchants or sponsors of the least or most effective showings of their commercial.

It may also be desirable to purchase items from use of the card. The card can store purchasing information, such as the numbers of one or more credit cards. This can be used, for example, when a card is capable of receiving multiple offers. After such an offer is downloaded to the card, the user connects the card to the Internet via wireless means or through the computer interface port. The user selects the offer, and selects to purchase the discounted item. The stored credit card and shipping information are transferred through the Internet to carry out the transaction. The card can also store other data sufficient to make purchases, such as debit card or online wallet service information.

Figure 7:
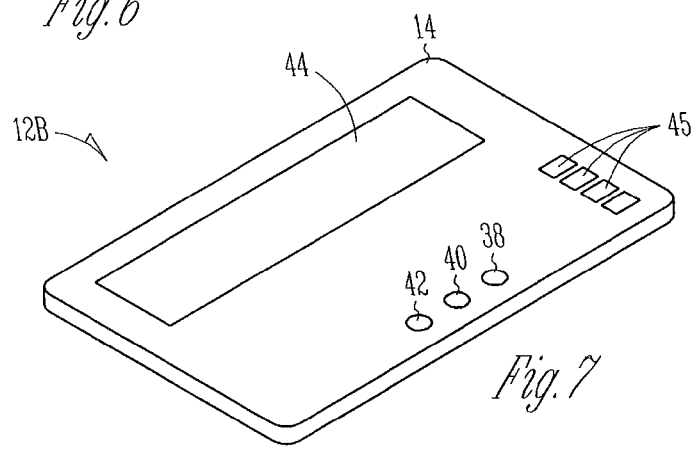
FIG. 7 is a perspective view of internal features of the interactive device of FIG. 4 of the embodiment of FIG. 6 showing an interactive card of the invention.

FIG. 7 shows circuit features of the card of FIG. 6 without its enclosure. Display 44 is evident, as also controls 38, 40 and 41, and a pair of batteries or cells 45 are located at the right side of the circuit board.

Figure 8:
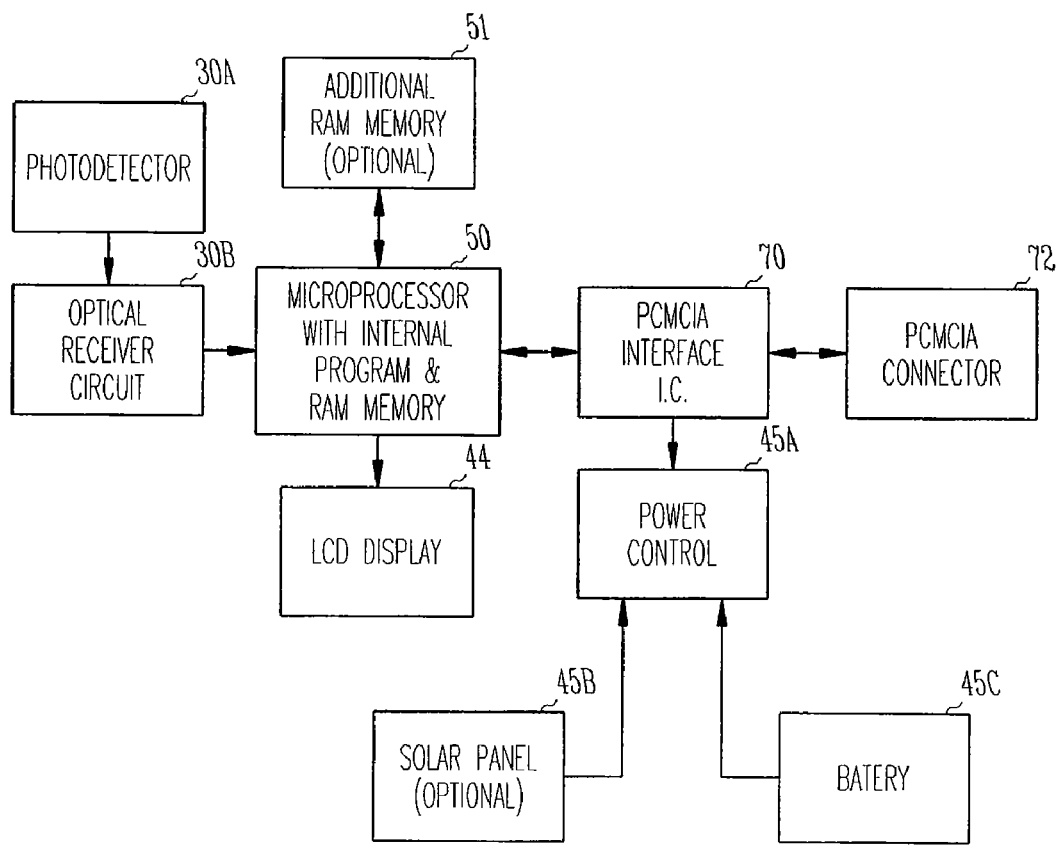
FIG. 8 is a schematic diagram of circuitry that may be used to provide various embodiments having circuit features evident in this diagram.

FIG. 8 shows an alternate embodiment of the card, hereafter referred to as an computer-interface card 12I having an input-output means in the form of a Personal Computer Memory Card International Association ("PCMCIA") interface 70. PCMCIA interface 70 connects with PCMCIA connector 72 to transmit information to and from a computer or computer-like device. Connections of the computer-interface card to computer or computer-like devises are preferably made by a PCMCIA slot, but the connection means may alternatively be other through other known slots, connections, and ports such as Ethernet, Token Ring, infrared ("IR"), RF, Small Computer System Interface ("SCSI"), Universal Serial Bus ("USB"), parallel port ("Parallel"), serial port ("Serial"), IEEE 1394 FireWire ("FireWire"), S/PDIF, AES/EBU, fiber optical cable, and Apple Desktop Bus ("ADB"). The card may also utilize portable data storage, such as flash memory or mini-disc, to manually transfer information from a card to a computer or computer-like device. The types of connections used in various applications of the computer-interface card vary based on factors including cost, transfer speed, and acceptance by users and industry.

The card is preferably connected to a computer, but can also be connected to computer-like devices or other devices capable of processing information transferred from an computer-interface card. These devices may include a Portable Digital Assistant ("PDA") or other palm top PCs, cell-phones, and other hand-held net-connected or computer-like devices. The card may alternatively have wireless Internet access, which allows for instant Internet transactions without utilizing a computer or computer-like device.

As in other embodiments of the card, composite video signals are preferably received by a photocell, herein shown as a photodetector 30a and an optical receiver circuit 30b. The power and functionality of the card are increased by additional RAM 51 connected to the microprocessor 51. The power system of the card, comprising the battery 45c, an optional solar panel 45b, and the power control 45a adequately provide the power needed for processing and interfacing with various devices.

After the video signal is optically received by the card, the received data may be sent immediately to the PCMCIA interface 70 through the PCMCIA connector 72 for discriminating on a computer, or may be discriminating by the microprocessor 50. If the received data is processed on the computer, the computer may act as a discriminator, determining when auxiliary data is present and handling it appropriately. The data also may be sent back to the card for further processing, promotion, or information opportunities. When the received data is not sent immediately through the PCMCIA interface 70, the data is processed as in other embodiments described herein.

Instead of or in addition to an optional visual response by LEDs or LCD 44, promotional data may be available to the user upon connection of the PCMCIA interface with a computer by the PCMCIA connector 72. Such promotional data includes Internet website or addresses, textual information and code, audio, and visual files. Upon receiving the data either by optical detector 30 or by PCMCIA interface 70, the card may display an appropriate confirmatory message on the optional LCD display 44.

An example of use of the card is as follows: A store or sponsor issues a card to a child. During cartoons, or at other times when children are likely to watch television, a program is displayed which contains modulated video signals. The program advertises a product sold by stores or created by a sponsor. The children are instructed to use their card to tell their parents what toy they want for their birthday, holiday, or other special occasion. After capturing the auxiliary data containing information or product data, the children give the card to their parents. The parents can then connect the card to their computer with Internet access, and purchase online the toy or toys from the store, from the sponsor directly, or from a store suggested by the sponsor. The toy will then be shipped to the location specified on the card or online. If the card has wireless Internet access along with the parents credit card and shipping information, the parents can enter their approval code and purchase the product. Alternatively, the parents can bring the card into a store or send it in to the store or sponsor so that the order can be processed and fulfilled. Thus, parents can purchase the toys desired by their children with minimum time and effort. It will be apparent that this card could alternatively be used in a manner similar to a bridal registry, where the selected objects are not purchased, but are instead listed online on a gift registry. Thus, people who desire to purchase toys for the child will know what they child wants.

Another example of use of this card is as a loyalty card which stores bonus points in the memory of a card and (additionally or alternatively) at a remote location such as a central computer. The card stores bonus points for television shows or movies watched containing auxiliary data with bonus point values. Shows may require the user to obtain the auxiliary data at the beginning, during, at the end, multiple times during the show to receive the bonus points for watching the show. Users can receive additional bonus points by purchasing VHS or DVD movies, movie theater tickets, or merchandise. Users can receive additional bonus points by visiting the sponsors Internet websites, and even more for exploring their website and making online purchases. Users can receive even more points by responding to quizzes, questions, and surveys after television shows or movies. Users can interact by using their card to select their answer, and either upload their answer through the Internet, or verifying their answer upon review at a store. Users can earn additional bonus points by trying out specific restaurants related to the sponsor or, if at an amusement park, for rides and shows sponsored by the sponsor. Users can obtain even more points by spending nights at selected hotels (as described below). Thus, users have various opportunities to amass bonus points from many various sources by a sponsor or groups of sponsors.

Figure 9:
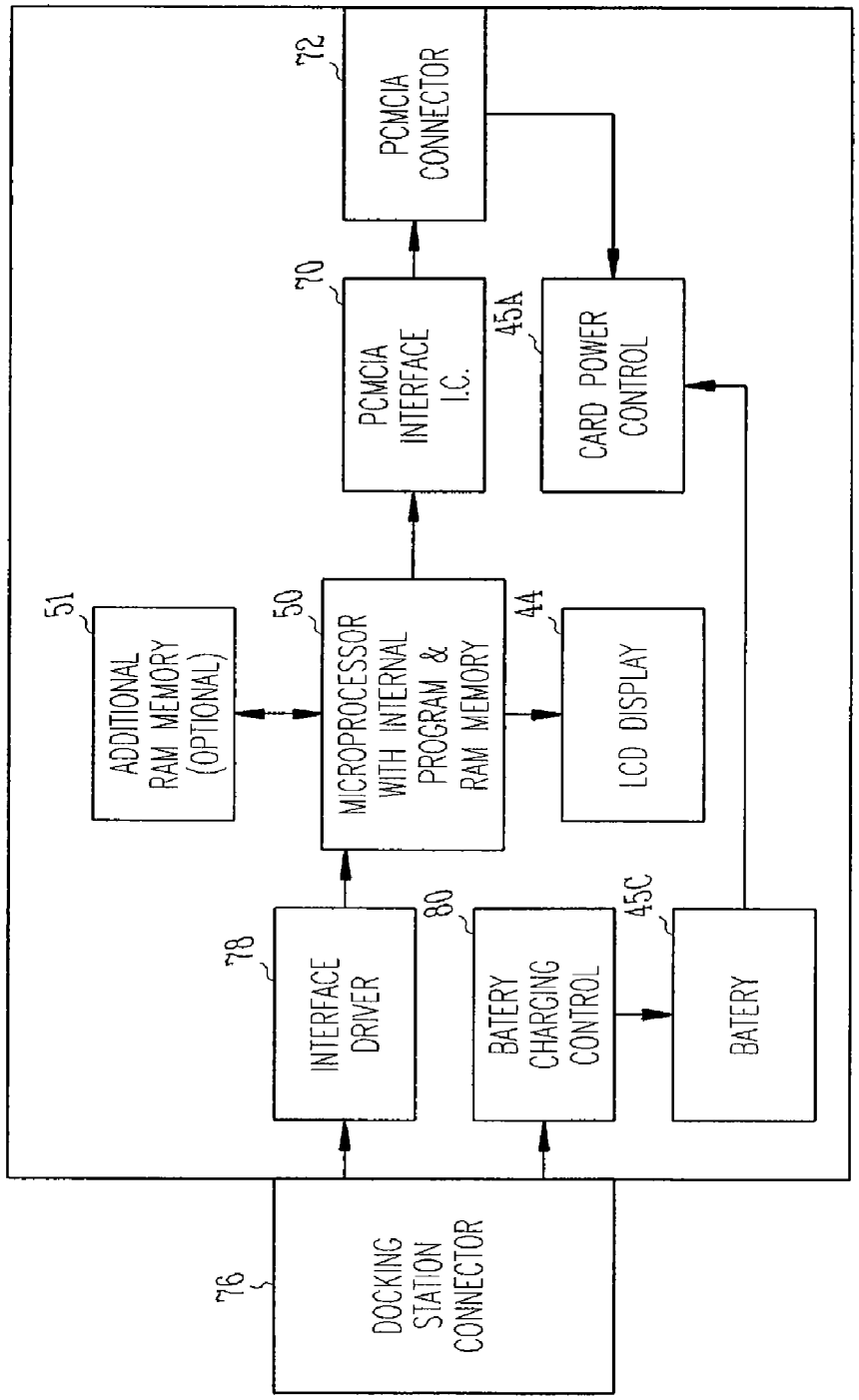
FIG. 9 is a schematic diagram of other circuitry that may be used to provide various other embodiments.

FIG. 9 is another embodiment of the card device 12 with an input output interface in the form of a PCMCIA interface 70 and a docking station connector 76 as shown. The docking station, which can contain optics, can be used to optically detect the video signal from a display device. Then either the entire video signal can be transferred to the card so that the card can discriminate the auxiliary data, or the docking station itself can discriminate the auxiliary data and transmit the auxiliary data to the card. The data can be transmitted to the card by IR, RF, or by a computer interface.

The docking station can charge the battery 45c by its battery charging control 80 as will be appreciate in the art. The docking station can implement various card functions and advanced card functions by controlling the card's microprocessor 50 through the interface drive 78.

Figure 10A:
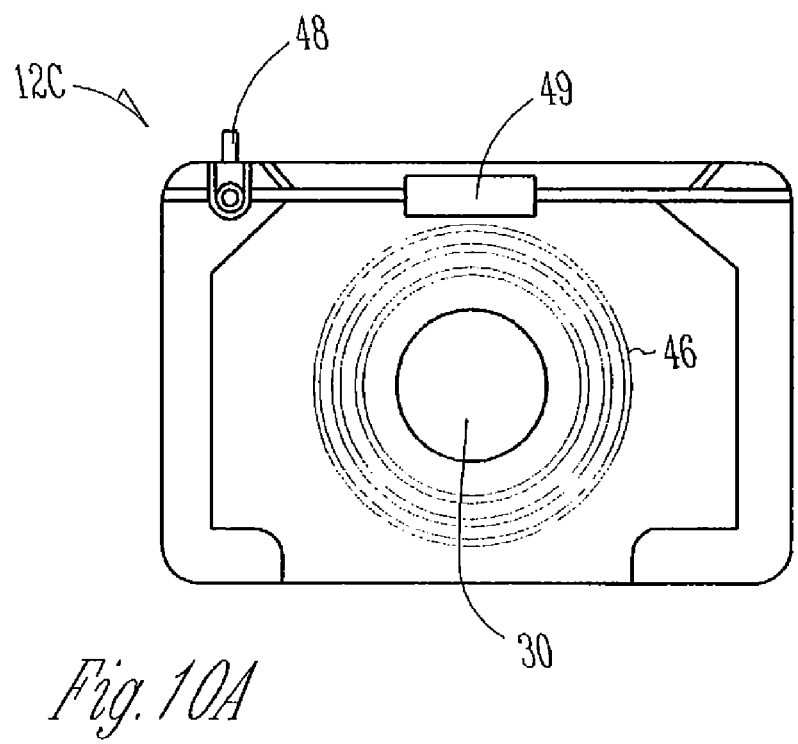
FIG. 10A is an external view, from a user-opposite position, of one surface of yet another embodiment of an interactive card of the invention, termed a camera card, showing the camera-like surface of the card during use.

The card in FIG. 10A may be termed a camera card, as it is similar to the other hand-held devices described herein, yet configured to simulate and suggest to the user the appearance of a small snapshot-type camera.

The camera card includes housing in the shape of a small camera, and a lens or lens simulation suggesting use of the camera-like hand-held device just as a user would use a snapshot camera, to take a "picture" of the display device. Camera card 12C includes a simulated lens 46 either imprinted, embossed, molded, or otherwise extending slightly above the surface of a camera-like housing 47 so as to present a more realistic simulation of a camera lens. The data-receiving photocell, when present, collects information in the same manner as previous embodiments using optical detection, and may be located behind simulated lens 46 or beneath a suitable aperture.

Button 48 when depressed and released simulates the shutter of a camera. Thus, it causes the card to receive either composite video signals or auxiliary data (depending upon the method as described above) until such collection is complete, thus the user simulates taking a snapshot or picture.

A viewfinder 49 is provided in the form of an aperture extending through the housing, suggesting that a user aim at a display device through the viewfinder as they would on a real camera. The viewfinder need not have any special accuracy or lenses, as its primary purpose is to simulate the look and feel of a camera. The camera card will operate properly when the camera card surface containing photosensor 30 is oriented toward the display device, and its orientation need not be precise in the sense of a camera but only approximately directed toward the source of video signals. Photosensor 30 may be positioned behind the simulated lens or elsewhere for suitable sensitivity to video signals emanating from the television set.

Other nonfunctional decorations (not shown) may be provided with the camera card to make further suggest to the user that they are taking a picture. Examples of such include a wrist strap attached to the camera, a camera case, an audio transducer in the circuitry of the camera card to make a clicking sound, or a flash.

Figure 10B:
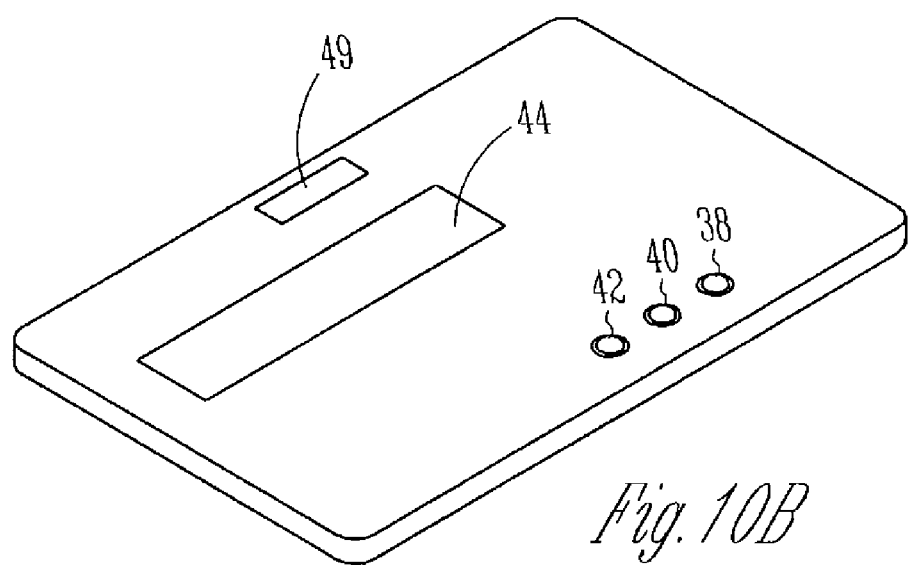
FIG. 10B is reverse view of the camera card of FIG. 11A, showing an opposite surface of the card on which user display and controls are provided.

FIG. 10b shows the reverse face or side of camera card 12C. It has controls and display features similar to those shown in FIG. 6. A difference is that the enabling button 22 may be located along a top surface or edge of the camera. Camera card 12C is intended to allow users to better conceptualize the process of receiving composite video signals from a television receiver. Use of the camera card may also provide other unique and fun opportunities such as pretending to take pictures and receiving such offers as previously stated.

Figure 11A:
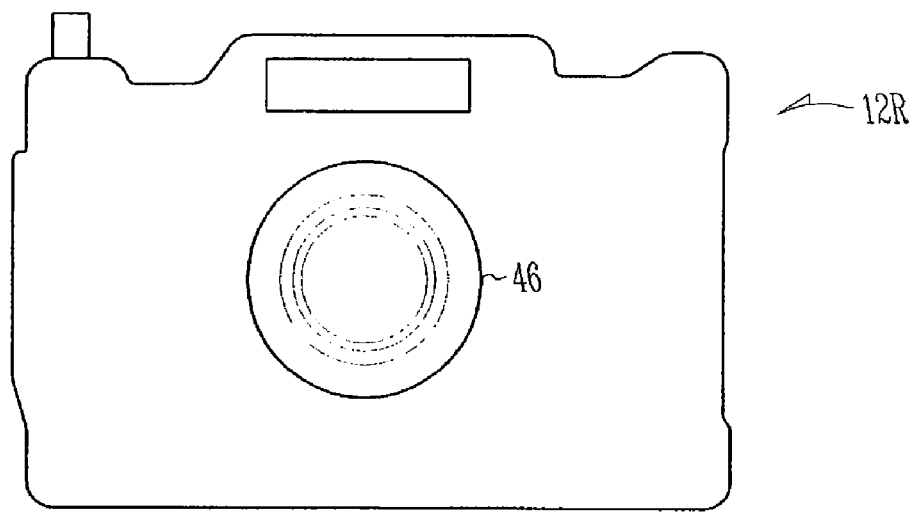
FIG. 11A is an external view of another embodiment of an interactive card or device of the invention, showing a surface of the card that is camera-simulative as according to FIG. 10A, and where again the card or device simulates the form of a hand-held camera, and is also referred to as a camera card.

FIG. 11A is the front of another version of interactive hand-held device 12 that may be termed a "racing" card 12R. On the front of this camera card is a simulated lens 46, of a size smaller size than that of the camera card 12C, enabling more promotional information to appear on the front of card 12R. The promotional information may show or describe the racer or event(s) that card 12R can be used for or otherwise promote holder usage.

Figure 11B:
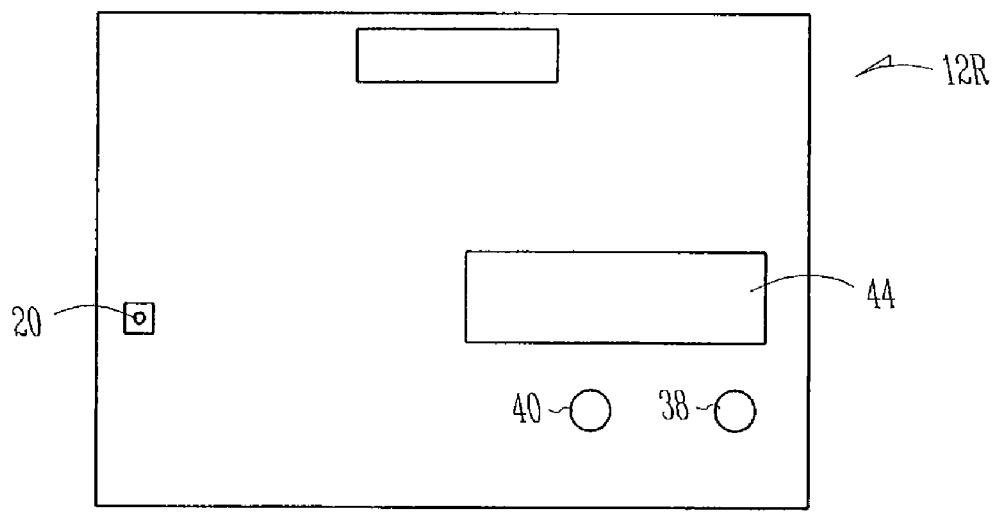
FIG. 11B is reverse view of the camera card of FIG. 11A, showing an opposite surface of the card on which user display and controls are provided.

FIG. 11B shows the reverse face or side of racing card 12C. It has controls and display features similar to those shown in FIG. 6. A difference is that the enabling button 22 may be located along a top surface or edge of the racing card. Racing card 12R is configured to allow users to better conceptualize the process of optically receiving composite video signals from a display device. The card may also provide other unique and fun opportunities to the user such as receiving driving statistics and various offers and information as previously stated.

Figure 12:
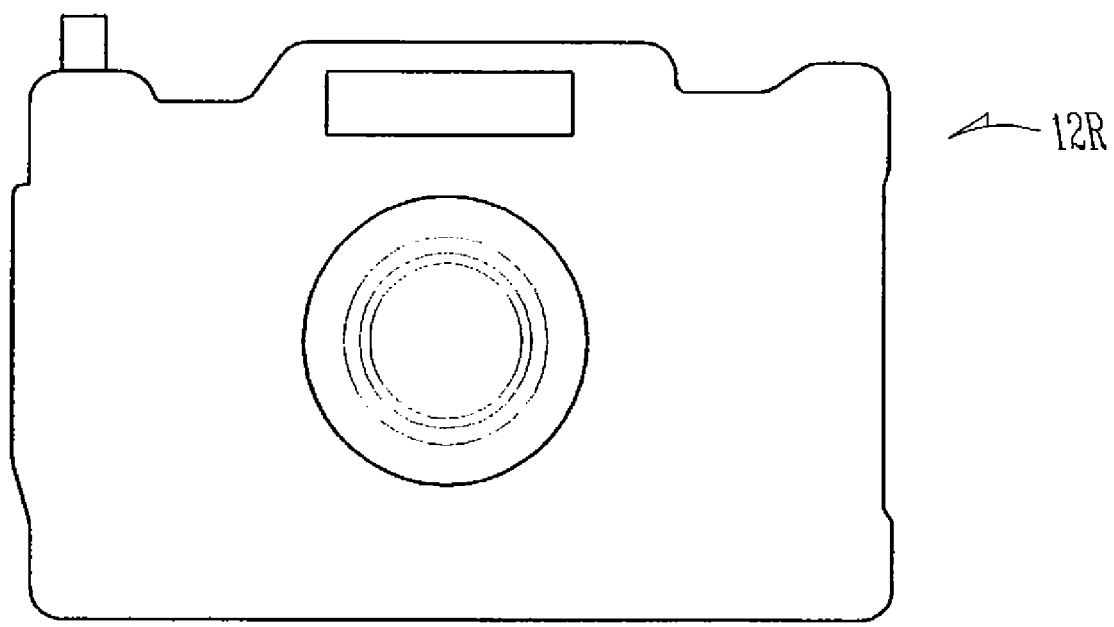
FIG. 12 is an external view of the camera card embodiments of FIGS. 10 and 11, showing how the camera card is used, as by sighting through a viewfinder of the card.

FIG. 12 shows the front side, i.e., user-opposite surface, of the racing card, with the user preparing to receive composite video signals by means of card 12R, and where the user is aiming the card toward a display device, such as television receiver or monitor, by sighting through the viewfinder. The card has control and display features like those illustrated in FIG. 11B or 11A.

As the racing card is used, auxiliary data may be received which may either update or replace that which is stored in memory of the card. Also, as the scroll button is depressed, more data than that displayed by the LCD display may scroll across the display. For example, the racing card may have stored within its memory information about a race, a racer, or other information relative to the event. It may include, for example, previous performances, standing of the racer, and biographical information.

To provide a suggestion of the use of the card and to enhance its attractiveness for users, especially young users, a reproduction of a racing car steering wheel and instrument grouping may appear on the surface of the card, adjacent the LCD display, as shown.

Figure 13:
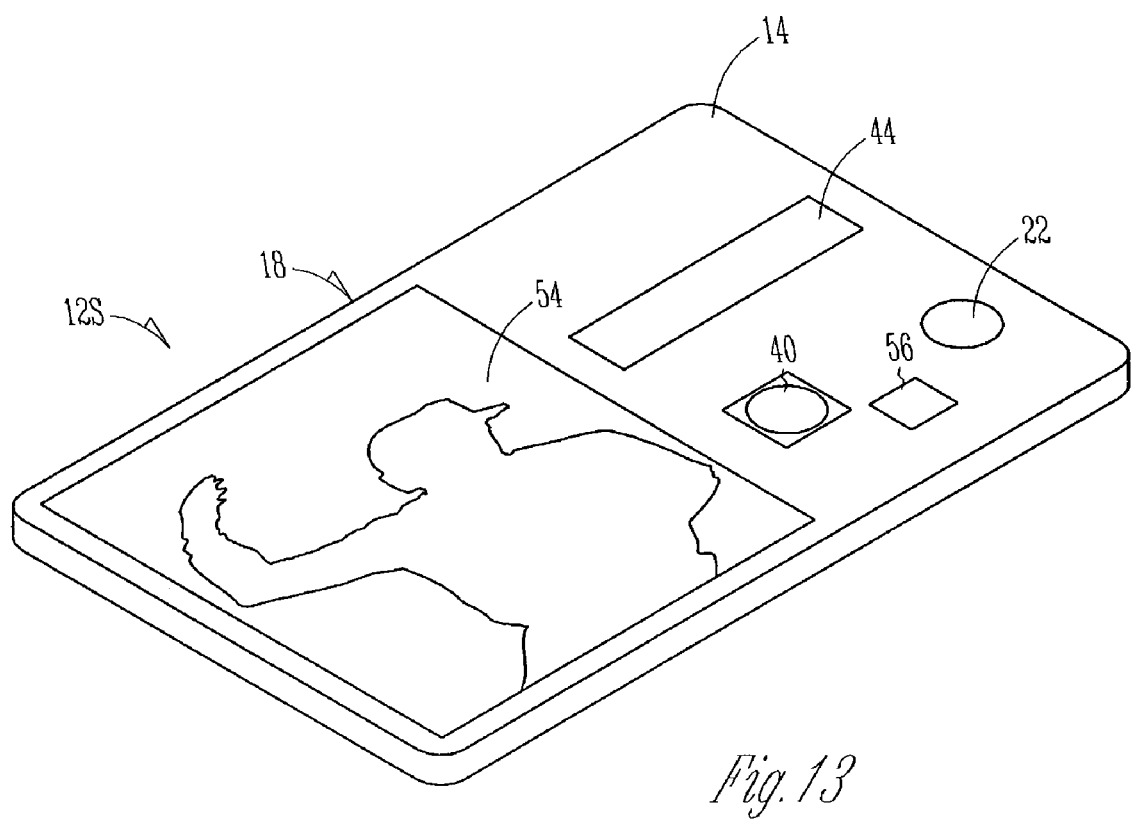
FIG. 13 is a perspective view of yet another embodiment of an interactive card of the invention, and referred to as a sports card.

Turning to FIG. 13, a version of hand-held device which may be termed a "sports" card 12S is shown. It includes an enclosure 12 which is provided with a front surface 16 which may include a visual field 54 for bearing the image of a sports contestant. In addition, a LCD display 44 is provided together with a button 22 which allows the user to initiate operation of the card, preferably when oriented for optically receiving composite video signals, such as by holding it so that leading edge 18 is generally towards a display device presenting a program related to the sports celebrity or other person depicted on the card.

Update button 56 is pressed when user desires to obtain some current information, such as the current statistics of the player depicted on the card. In operation, the sports card may be designed to receive only information relating to the player depicted on the card, update that player's statistics, or add to information about the player already stored in memory of the card, any of which can then be scrolled across display 44 by pressing scroll button 40.

Use of sports card 12S is as follows: A display device near the user presents a professional sporting event, such as a baseball game. When the sporting event's participant becomes the focus of attention, such as a professional baseball player coming to bat, button 22 may be actuated. An aiming light (as described above), if present, may illuminate, or instead LCD display 44 may initiate a readout of its newly received statistics associated with the depicted player. For example, the readout may identify his name, his batting average, the number of home runs hit, games played, number of times at bat, and his runs batted-in average and number of stolen bases, with the statistics updated each time such a player is at bat. The statistics (alternatively or additionally) may be sent to a computer through an interface (as described above).

A memory of the sports card may include such statistics in a non-volatile form by which the card is enabled to update the statistics each time the player comes to bat. Auxiliary data associated with an at-bat occurrence received by the sports card may contain information associated with the player, such as his current statistics. As play continues, received auxiliary data may include updates for those statistics based upon the experience of the player at bat. The information is stored in a circularly linked list of data and may include various statistics from different games that the player has played in, various statistics over multiple years for this player; or if this card is for use in watching an entire team, for instance when sponsored by the owner of the team, it may contain different information on various members of the team.

For example, as a celebrity batter is taking his turn during a baseball game, the television viewer directs his card at the display device to receive composite video signals, or otherwise connects his card so he can electrically receive the auxiliary data. In both cases, the viewer receives real time statistics about his favorite athlete during the telecast via his interactive sports card. The information received into the card can take many forms including, as noted, statistics such as batting average, home runs, or other personalized information about the player that is stored in the card for future reference or updating. The stored information can then conveniently displayed on the LCD display 44 for the cardholder by the push of button 40 or button 56, or otherwise transferred through a PCMCIA computer interface port to a computer.

Because the new sports card enables users and owners to trade the cards among themselves, the card takes on a special value and enhances its worth as it is used. As the card acquires data and is updated by use during televised play, the card becomes increasingly more valuable and attractive to acquire. The sports card may be of a design resembling a baseball card and can be traded for other sports cards. In addition, the cards may be equipped to retain a permanent serial number or edition number, or other information giving the card unique identity or value and thereby becoming a valuable collectible. Optionally, the card may be connected via an interface such as IR to transfer stored information to another card capable of receiving those results. The card can therefore be used in rotisserie opportunities.

In addition, the card may provide capability for certain permanent characteristic information, such as the batter's name, team, previous teams, and other characteristics, personal data, and additional data that may become permanent based on received statistics and information. Such characteristic information may be called to the display or otherwise received by and displayed on a computer.

The sports card can be used for coupon indicating and redemption purposes. During play, other information such as a trivia game or quiz may be received by the sports card where the answer will be revealed later, such as during the course of the game, at the end of the game, during half-time, or at any other appropriate time during play. A game may be part of a promotion wherein a user selects the answer and purges the remainder of the stored data, then takes the card to a benefit store or other redemption site during the course of the next week, and has the possibility of receiving some kind of discount or prize based upon the answer selected. Such a game could be part of a "guess today's attendance" at a professional baseball game during seventh inning stretch.

Use of the sports card 12S in connection with a baseball game is merely illustrative. Other sports in which players have statistics which change during play, over a year, or which may include information unique to the player, such as hometown or previous teams, can similarly be downloaded or conveyed by the card. The sports card may also be used in connection with concerts and other special presentations, when televised or appropriately presented. Card holders thus are able to acquire useful information about the concert or special presentation, such as the names of performers, set lists, the venue location and history, and related Internet addresses. The card can also be used to receive information relating to monuments, buildings, cars, animals, etc during the course of a presentation.

An alternate version of the sports is a hand-held device that may be termed a "gaming" card. The gaming card, similarly to the sports card, encourages users to interact with video broadcasts of sport events. However, in this embodiment, users viewing a televised live sporting event utilize their gaming card to predict future actions by a selected player or team to amass points in competition with other users.

For example, two baseball teams compete in a game featuring live modulation of auxiliary data. A sponsor or various sponsors distribute gaming cards to various participants prior to the start of the game. Users predict each pitch to be thrown for selected batters, pitchers, or teams, using a number code for each pitch. Alternatively or additionally, pitching results (i.e., balls or strikes), hitting results (i.e., strikeouts, walks, hits, homeruns, etc.), runs per inning, or other calculable statistics can be selected prior to occurrence. Correctly guessing the occurrence earns points, which accumulates in the memory of the card. Following the game, the card users can submit their cards either at a collection location or through an Internet connection and submit or upload their scores. The user with the highest point total wins a large prize or discount, with various consultation prizes alternatively available. The predictions can take place for one particular batter, in one particular inning, or for one particular team. Gaming cards can also be used in a similar manner to predict and play other events such as basketball, hockey, and football.

The hotel card 12H is yet another embodiment of the card with the functions of a sophisticated hotel room key. The hotel card works with a smart card reader lock system, allowing guests of a hotel to enter and exit rooms, such as a guest's hotel room, garage, or pool area. The hotel card can allow similar access by an optional magnetic strip located on the exterior of the enclosure.

Upon hotel check-in, guests are given a hotel card to use throughout their stay. Hotels and hotel chains may alternatively issue permanent hotel cards to frequent guests and initiate hotels stay with room access on the user's card at check-in. A child's version of the hotel card can be provided upon check-in, to allow children restricted access to hotel facilities and special promotional benefits available only to children.

Once a guest receives the hotel card, the card can be used to enter the guest's room and other hotel facilities. The guest user can also use the hotel card as a charge card, charging products and services internally, such as dinners at the hotel's internal restaurant, gifts at a gift shop, or snacks from a vending machine. The incurred charges will be recorded on the hotel card, appearing on the user's bill at check out.

Coupons, benefits, or information can be loaded onto the hotel card at check-in and at other desirable times and places, such as the beginning of the each day at the hotel's front desk. Using a smart card writer, the hotel cards can be loaded with opportunities for use or redemption over a limited amount of time. These opportunities or coupons may be discounts for local attractions, cash equivalents such as gift certificates for use at particular local attractions such as a restaurants, information on special pricing, or additional access privileges. The card may also load the guest's hotel preferences, including room type and preferred activities.

The hotel rooms may optionally provide reader/writers in the hotel card user's room. Data is written to the smart card as a result of the electronic decoding performed by the docking station. The docking station can also read the data from the card, and transmit the information to a central computer preferably by a network line or otherwise by a telephone line. Alternatively, the reader/writer can be in the form of a remote control, acting as a cradle when the card is properly inserted. IR sends data back and forth to and from a networked docking station and remote control.

The reader/writer reads stored data off of the hotel cards, and displays relevant information on the television in the guest's room. Such information may include the total from the purchases using the card, combined with room costs to generate the hotel bill to date. The guest can also purchase items through use of the hotel card and an appropriately connected docking station for items such as tickets to a local attraction or additional hotel services. An alternative means of reading and writing to the card is through use of a computer and computer interface on the card, as described above.

Guests can obtain additional coupons by viewing television programs modulated with auxiliary data. Such data may be optically received directly to the card, electronically received by the docking station, or received through a computer interface. The information received by the card typically relates to special discounts as well as information about area attractions. Television stations or the hotel itself can modulated the television signals to limit the viewers capable of receiving the signal. Thus, only visitors having the specialized hotel cards can receive the special discount.

The hotel cards can be used as credit cards, and optionally contain a charge limit along with information as to where the card can be used to buy items and then charge them to the hotel room. Thus, businesses outside of the hotel can enact purchase transactions on the hotel card, which are added to the users bill. The charge limit many optionally varies based on guest stay frequency, charge history, or credit history.

The hotel or other sponsor may allow the user to collect bonus points by use of the hotel card. Permanent hotel cards store a running total of bonus points, with optional frequent back ups of the point total to a central computer through properly connected reader/writers. Alternatively, upon each stay the hotel card can be loaded with bonus points earned from previous visits and stored on a central computer. Bonus points can be awarded per stay and per night, or based on other purchases made with the hotel card. Additional bonus points may be earned by visiting local attractions. Bonus points may be redeemed for a gift, discounts, free meals, room upgrades, a free night's stay, or converted to airline frequent flyer miles.

Agreements with local attractions provide additional means for user advertising. Indicia of various agreements and sponsorships may be visible on enclosure 14 of card 12. Various offers and information on attractions may be encoded on hotel card 12. All purchase transactions are logged, and the appropriate charges occur when the guests checks out. The hotel can charge a flat fee or percentage for these promotional activities.

Guests have incentives to use their hotel card 12 and visit attractions encouraged by card 12. Guests eat at a suggested local restaurant, receiving a discount on the meal, paying by the use of hotel card 12, and receiving bonus points. For example, a local restaurant may have a buy one get one free coupon loaded on to card 12, so the guest is more likely to go to that restaurant than a competitor without a coupon. The guest can then visit a major attraction and get bonus points for various suggested activities that they do or items that they buy, for which the purchases can be made through hotel card 12. Attractions that wish to honor hotel card promotions should have a reader/writer and a dial-up or network connection to the central computer if a purchase is possible at the attraction. However, accumulating bonus points can be performed by simple write transactions on the card, so that the points are stored on the card and are not immediately transferred to the hotel's computer.

At checkout time, the guest's account is cleared out and paid. Guests, if desired, can have an "express check out" such that they do not need to sign a bill, but simply swipe their hotel card across a reader with a connection to the billing center. The hotel card is either returned to the hotel for resetting for future clientele, is disposable, or is made inoperable until the guest's future check-in. Before clearing the card, bonus points and information regarding purchases and uses may be stored in the hotel's computer. On the next stay, the user's bonus points will again be accessible. Alternatively, a third party or clearinghouse may set up the coupons and distribute the cards. The hotel would then get a percentage of the overall value of the transactions or a sales commission.

Interactive cards specially configured for conventioneers (or conference attendees) may be termed a "convention" card. Convention cards permit conventioneers to capture information about various demonstrators and companies by viewing various booths or video presentations and capturing information or opportunities to the card. Information is captured from the reception of auxiliary data, as is described above. If the demonstrators so desire, the conventioneers may receive coupons on their convention card for discounts or free gifts from visiting the demonstrators' booths. The coupons are redeemed by visiting the demonstrator's store or Internet website.

Another valuable manner in which the cards may be used is to receive auxiliary data at a convention, show, or other any other type of special event, and then offering users opportunities to receive useful information at the special event. For example, a user may watch a video presentation in a convenient location, such as a hotel room, about an upcoming convention. The presentation may show booths, locations or special offers at the convention. As the user sees one of these booths, locations or special offers, the user selectively uses the card, by pressing its operating button 22 or equivalently initiating control, to cause the card to receive auxiliary data (as described above) which identify these booths, locations or special offers. Then, the user may visit the convention premises, operating the scroll button of the card to display the booths, locations, or special offers conveniently and helpfully as the user goes about the convention.

The convention cards may be presented to the conventioneers with their name and address preloaded, so that the cards can be conveniently read at each convention booth by card readers. The convention cards can also provide conventioneer information to the sponsor when used at their store or Internet website.

Before or during the convention, conventioneers can watch television in their hotels rooms or in a common area to learn about the companies that will be presenting or have booths at the convention. The conventioneers can selectively receive information or coupons from the demonstrators by optical and electrical methods. Thus, users can receive information such as booth numbers and locations, and as well as opportunities for discounts that can be used during the convention.

Another embodiment of the convention card can be referred to as the "museum" card. The museum card allows visitors to track areas or exhibits at a museum. Embodiments of the card may have LEDs, to signify receipt of auxiliary data from any of the sources described above. Such a device used by a school teacher to verify that students have visited specific exhibits at a museum or museums that have video demonstrations or otherwise send data through RF.

The museum cards may have an optional LCD display to further direct the card's user. The user is therefore provide with instructions on the location of the next exhibit, time left in the museum before closing or before user's groups departing, redeemable coupons for the museum's gift shop, or other information relevant to the exhibit or museum.

The museum card is usable at a series of locations, such that users obtain indicia or information from each location. The card can be used in activities such as "scavenger hunt", where users must obtain the proper information or indicia from each location to win or complete a game or activity.

Figure 14:
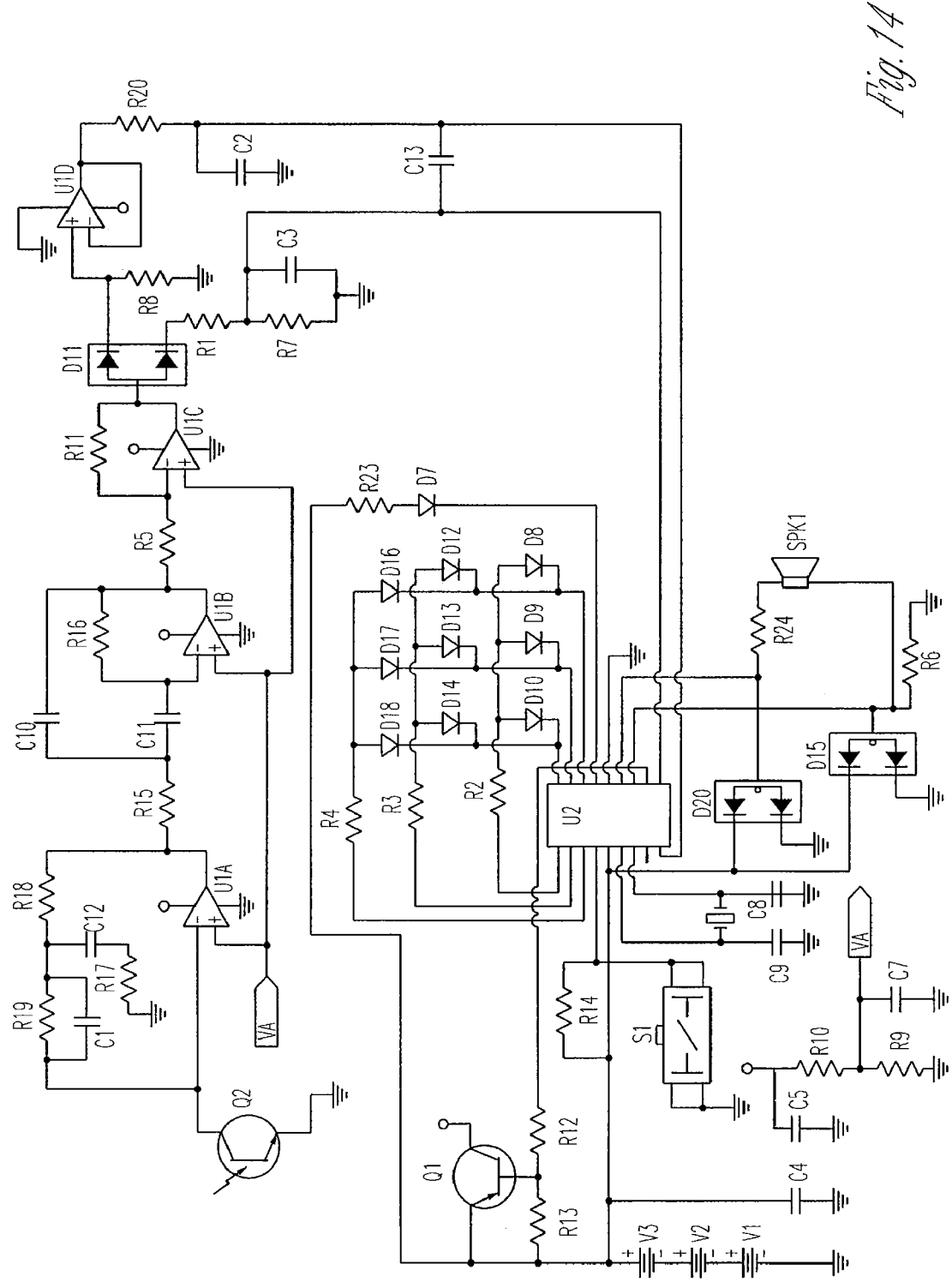
FIG. 14 is a block diagram of other circuitry that may be used to provide various other embodiments.

In FIG. 14 a schematic circuit diagram of one form of circuitry that can be used to provide the features and functions of the several embodiments described herein, elements are identified by their conventional numerology conventional characters proximate of the elements. Photosensor 30 is seen to be constituted by a photodiode or phototransistor Q2 which provides the signal to amplification and filter circuit consisting of an operational amplifier U1A including a circuit consisting of the components of C1, R19, R18 and C12 interconnected between the output and the inverting input of operational amplifier U1A, and so providing an amplifier and filter. Thus amplifier and filter signal is provided through R15 to a filter and frequency shaping circuit comprising of an operation amplifier U1B having in its feedback circuit the components C10, C11 and R16. These circuits provide a filtered, frequency-shaped output through a resistor R5 through a circuit consisting of operational amplifier U1C and resistor R11. Operational amplifier U1C has an output coupled to a diode pair D11 which thus provides a pair of outputs, the upper to a circuit comprising an operational amplifier U1D, providing in effect a buffer whose output is a data signal delivered through a resistor R20, and the lower of the diodes D11 providing a signal through a resistor R1 to a further resistor R7, across which is a capacitor C3. The node between resistors R1 and R7 provides 16 kHz signal that is of the horizontal line scan rate or frequency television display optical signals received by photosensor 30 (Q2). The horizontal scan frequency of conventional NTSC color signals is, more precisely, 15.625 kHz. (approximately 16 kHz, as here described). Similarly, the discriminator circuitry provides at the output of operational amplifier U1D an 8 kHz signal representative of the auxiliary data received, as produced by alternate-line luminance modulation of the display. The discriminator circuit thus described provides both the 16 kHz and 8 kHz (more precisely, 7.8175 kHz), which constitutes the actual data, and determines whether the 8 kHz data carrying the information (data) content of the received auxiliary data is present by determining whether average signal magnitude of the 16 kHz or 8 kHz signals is greater, so that if auxiliary data is present, i.e., there is 8 kHz modulation energy in the received light signals, they are provided to a microprocessor of the U2 of the circuit for decoding the information content within the 8 kHz signal. Thus, the received composite video signal is amplified and filtered to de-emphasize the 16 kHz signal and retrieve the 8 kHz signal carrying the data. I.e., wave shaping and frequency shaping filter circuits provided by operational amplifiers U1A & U1B de-emphasize the horizontal retrace frequency and amplify the half-frame rate carrying the data content of interest. The circuits filter the frame rate signal and use it as a reference to compare its relative signal magnitude against the 8 kHz data-carrying signal. If the retrieved 8 kHz signal is of greater magnitude than the conditioned 16 kHz signal, auxiliary data is present and may be utilized by the processor. Microprocessor U2 is preferably of commercially available type Z86E02, and operates according to machine instructions stored in its resident ROM memory. Flowcharts of the functions performed by the machine instructions are set forth in the appendix. Although not separately shown microprocessor U8 includes random-access memory (RAM or DRAM) in which decoded data is stored. Thus, microprocessor U2 is to decode and store, or store indication of, the data present in the 8 kHz signal, as by illuminating one of more of the LEDs and causing them to remain on as evidence or indication of the data, substantially in accordance with the teachings of Broughton, and to drive displays of the card and/or its LEDs or other signal devices, as well as to provide any audio function, as well as also to energize an aiming LED7 when auxiliary data is present. So also, if desired, a signal may be driven by U1 in response to the presence of the auxiliary data, thus providing an aiming light function indicating, in simple effect, that the hand-held device is receiving composite video signals.

For providing illumination of lights 20 or 20a-20d described above in connection with the various embodiments, shown here are nine LEDs D9-D18. It will be understood that not all of these LEDs need be used for a specific embodiment of the card. That is, the circuit may be configured so as to drive one, two or three or more of the LEDs as according to the desired function and use of the card.

Shown adjacent microprocessor U2 are two diodes D15 and D20 which are used to bypass any noise generated from the microprocessor. The speaker SPK1 is element 34 shown in FIG. 5. A clock crystal XTAL1 provides 8 MHz clock signal to microprocessor U2. Capacitors C8 and C9 are part of the clock circuit.

Immediately adjacent the clock circuit is a switch S1 to provide the function of button 22 in the several embodiments for initiating operation of the card. Switch S1 is tied to a power supply circuit comprising power cells a resistor 14, V2 and V3 (each of 1.5 v potential), and a resistor 14, and including a switched analog power circuit comprising a transistor Q1 and resistors 12 and 13 which enable power to be provided to the array of LEDs D8-D18.

Figure 15:
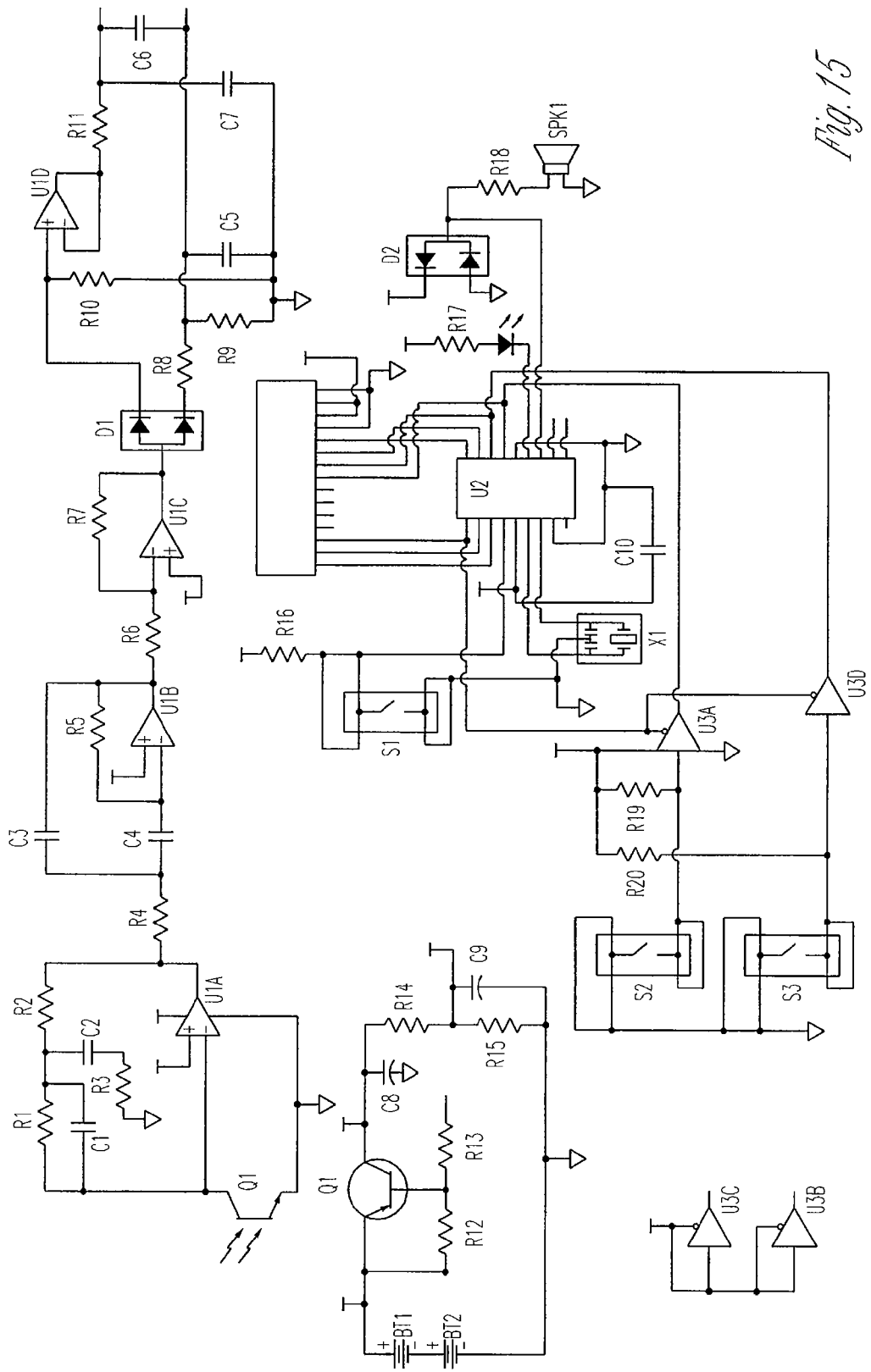
FIG. 15 is a block diagram of other circuitry that may be used to provide various other embodiments.

Referring to FIG. 14 there is FIG. 15 another version of circuitry invention is shown which may be used to provide still other embodiments of the optical cards or devices of the invention. It includes a microprocessor U2 which may of commercially available type Z86X08. It is similarly provided with 8 kHz and 16 kHz signals (more precisely 15.635 kHz and 7.8175 kHz) which respectively constitute the horizontal retrace signal and the data signal at half of that frequency, since the auxiliary data encoded on alternate horizontal lines and so is effectively present at only half the horizontal scan rate, as explained above. These signals are identified as VEILA and VEIL REF that are provided as inputs to microprocessor U2. Therefore, it will be understood that operational amplifier circuits consisting of operational amplifiers U1A, U1B, U1C and U1D provide the same functions of amplification, filtration, frequency shaping and discrimination, as well as buffer circuits described in FIG. 14. The microprocessor, clocked by crystal X1 at 8 MHz, decodes the data provided by the composite video signal, stores it in internal RAM or DRAM and drives an LCD display illustrated as circuit component LCD1 which may be, as shown, a 16-character by 2-line display. It may instead be a 12-character by 3-line display, for example, or other format appropriate for the display message to be presented at the surface of the card.

Power for the circuit is provided by two cells BT1 and BT2 of 3 volt potential to a circuit including Q2 to provide not only main power by auxiliary power, the later being delivered to the microprocessor for maintaining its continued operation, such as for date and time keeping even when the display is not being operated. A switch S1 is provided for performing the function of Button 38 (as shown in FIG. 6) in the several embodiments and, when pressed, enables power to be provided to the LCD1 and other switching functions may be provided by switches S2, which controls scrolling of the LCD display, and switch S2 may be actuated by button 40 shown in FIG. 10B. Similarly a switch S3 provides a date function that may be actuated by button 42 shown in FIG. 10B. These signals control inputs to operational amplifiers U3A and U3D, respectively, and these are provided as inputs to the operational amplifier and also to LCD1. The clear switch will, when operated as described above clause clearing of the date, and the scroll switch enables the user to cause the message across the LCD display, such as that indicated at 44 in FIG. 6. Operational amplifiers U3C and U3B provide voltages useful according to the connection illustrated.

The circuit embodiments shown are used in conjunction with a method for producing a composite video signal containing video program material and control data, and displaying the signal on a television and decoding such control data for ancillary use, wherein the method includes modulating at least one video field within the viewing area of a television in such manner that the modulation is substantially invisible to the television viewer, thereby producing a video subcarrier component of the signal (which is as indicated detectable at an 8 kHz rate) containing the data; and detecting the component to reproduce the data for the ancillary use. Although luminance modulation is particularly useful for that purpose when using smart cards in accordance with the invention, chrominance modulation may instead be employed as according to Broughton et al. U.S. Pat. No. 4,807,031. Various modulation (and corresponding modulation) schemes may be employed as alternatives, including (but not limited to) amplitude shift keying (ASK), frequency shift keying (FSK) modified frequency shift keying (MFSK), and phase shift keying (PSK). And although the substantially 8 kHz data-carrying submodulation is at half the NTSC horizontal scan rate, other submodulation techniques may be used at other multiples or submultiples or other periodic rates which are other functions of the horizontal scan (retrace) rate.

Another possible embodiment of the interactive optical cards, designated 12F, has discriminator and microprocessor circuits 50 which are in accordance with FIG. 14 or 15, and receives composite video signals by photosensor 30 so as to decode the auxiliary data and provide either light signals as described above, or, more preferably, to drive LCD display 44 according to the foregoing description. Thus, it includes an update or initiating button 22, as according to the sports card version 12S. In addition, an FM receiver 62 and associated antenna 64 may be provided as a surface-mount module added to the printed circuit board of the card. FM receiver 62 and associated antenna 64 may be of commercially available design, suitable for being powered by the same battery or cells (not shown) provided in accordance with the foregoing description of various embodiments. Control button 66 may optionally initiate operation of FM receiver 52 so that it sends FM-demodulated signals to the discriminator and microprocessor circuits 60 that may be configured to respond accordingly either to photosensor 30 or to FM receiver 62 according to whether button 56 is pressed.

Card version 12F may be sports card operating otherwise according to version 12S described in relation to FIG. 13, but the addition of FM receiver 62 gives the new card the capability of being used in sports stadiums and other performance venues where video signals are not available. In the case of a sports card according to FIG. 13, the user may as described above receive statistics about a player depicted on the card, or about a player at bat. According to a preferred method of using card 12F, the same auxiliary information as would be transmitted via a television broadcast for being received on a television display 10, there to be displayed as composite video signals, is in addition transmitted by low-power FM signals in the FM broadcast band of 88-108 MHz. For this purpose, FM receiver 62 may be pretuned to an appropriate frequency for such low-power signals. The FM signals may include batter statistics, for example, as batters come to bat, so that holders of the new cards 12F may update their cards as their preferred batters come to bat.

The new cards or card-like devices may have use in various sports events, entertainment presentation, conventions, museums, tours, and guided events at which holders of cards might not conveniently use them while in the presence of a television display carrying auxiliary data, but where the location in which the cards will be used will permit low-power FM signals. Other commercially significant usages of the cards of FIG. 14 can be made, similar to the methods of using the previously described versions. Similarly, devices of the invention can be adapted to receive AM signals, or auxiliary light signals such as IR (infrared) light signals, different from the composite video signals.

Similarly, hand-held devices of the invention, whether or not sized as "cards" in the sense of being like a credit card, wallet card or other conveniently hand-held size, and whether in the form of camera cards, racing cards, may simulate other objects, vehicles, personalities, or devices for house-hold, personal or business use, so as to provide a verisimilitude or facsimile representation of such devices or usages, so that the hand-held device suggests to the user the manner of its use, or conveys to the users special feeling, sense, identity or association with a field, activity, sport, entertainment or other use of the device it represents. In games, for example, in which some or all of the information content useful in the game can be provided by auxiliary data, hand-held devices of the invention configured to provide a verisimilitude or facsimile representation of such devices or usages may give players of the game enhanced sense of play, participation or gaming identity. The foregoing are merely illustrative of the many possibilities.

When used in a system for deriving benefit from encoded data including means for producing video signals modulated with auxiliary data, such as by providing commercially sponsored television programming including auxiliary data, new cards of the invention have special impact for television response, advertising and promotions, as the new system and devices are useful in providing, among others, the following commercially advantageous results when they are distributed to viewers and used by viewers to receive auxiliary data transmitted with normal programming content, which may include advertising, promotions and other sponsored transmission.

The present system and hand-held devices useful in the system may be for these purposes distributed by various business entities, which may include not only the sponsor of a program, event, or other sponsored transmission, but may also include various businesses, services and organizations having commercial relationships with the sponsor.

Viewer use of new devices of the invention accordingly provide commercially advantageous results relating to television advertising, promotions and other sponsored transmissions, wherein new system and devices and their use is effective to:

Attract viewer attention to advertising, promotions and other sponsored transmissions Effectively increase awareness and retention of message and product Induce viewers to respond and take action after viewing to sponsored transmissions Differentiate a sponsor's product or service from those of competitors.

Stimulate viewers to desire to watch advertising, promotions and transmissions.

Provide a novel, cost-effective, brand efficient, and enjoyable medium for enhancing advertising, promotions and other transmissions Cause advertising, promotions and transmissions to take on special event significance Build customer traffic in places of business or points of sale associated with sponsors of advertising, promotions and other transmissions Increase consumer loyalty to sponsors of advertising, promotions and transmissions Increase viewer involvement in sponsored advertising, promotions and transmissions Cause viewer retention of sponsor identity and advertising or promotional content Enhance sales volume resulting from the sponsorship of advertising, promotions and transmissions Provide lasting value to sponsored advertising, promotions and transmissions Provide enhanced viewer/spectator involvement in sporting and racing events Afford viewers of television programming an opportunity to interact meaningfully with programming content and with advertising, promotions and transmissions.

Enhance viewer good-will relative to advertising, promotions and events.

Cause development of still other opportunities for interactive use of the cards.

In view of the foregoing description of the present invention and practical embodiments it will be seen that the several objects of the invention are achieved and other advantages are attained. The embodiments and examples were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

The breadth and scope of the present invention should not be limited by any of the above-described exemplary embodiments, but should be defined only in accordance with the following claims and their equivalents.

What is claimed is:

1. A method comprising:
   optically receiving a first portion of a visual representation of a video signal on a portable electronic device;
   decoding on the portable electronic device the first portion to reproduce a first auxiliary data portion contained within the first portion, the first auxiliary data portion being modulated in an active portion of the first portion of the video signal, the active portion being included in the visual representation;
   determining whether the first auxiliary data matches at least a first portion of stored data on the portable electronic device to identify a first data match, the stored data being stored on the portable electronic device prior to the receiving of the first portion; and
   illuminating a first light-emitting device on the portable electronic device when the first data match was identified.

2. The method of claim 1, further comprising:
   optically receiving a second portion of the visual representation of the video signal on the portable electronic device, the second portion of the video optically received after the first portion;
   decoding on the portable electronic device the second portion to reproduce a second auxiliary data portion contained within the second portion, the second auxiliary data portion being modulated in the active portion of the second portion of the video signal;
   determining whether the second auxiliary data matches at least a second portion of stored data on the portable electronic device to identify a second data match; and
   illuminating a second light-emitting device on the portable electronic device when the second data match was identified, wherein the first light-emitting device and the second light-emitting device are sequentially illuminated on the portable electronic device based on the illuminating of the first light-emitting device and the illuminating of the second light-emitting device.

3. The method of claim 1, wherein the first portion is optically received from a display device, and wherein the first auxiliary data portion is at least substantially transparent within the visual representation.

4. The method of claim 1, wherein the illuminating of the first light-emitting device provides a representation of a value available for redemption by use of the portable electronic device.

5. The method of claim 1, wherein the stored data is stored in read only memory of the portable electronic device.

6. The method of claim 1, wherein the portable electronic device is preconfigured with the stored data prior to the receiving of the first portion.

7. The method of claim 1, wherein the video signal is an analog video signal.

8. The method of claim 1, wherein the video signal is a digital video signal.

9. A method comprising:
   optically receiving a visual representation of a video signal on a portable electronic device;
   decoding on the portable electronic device auxiliary data, the auxiliary data including sporting event information and being modulated in an active portion of the video signal, the active portion being included in the visual representation;
   determining whether at least a portion of the auxiliary data matches at least a portion of stored data on the portable electronic device to identify a data match, the stored data being stored on the portable electronic device prior to the decoding of the portable electronic device auxiliary data; and
   displaying at least a portion of the sporting event information on a visual display of the portable electronic device based on identification of the data match.

10. The method of claim 9, wherein the visual representation is optically received from a display device, and wherein the auxiliary data is at least substantially invisible within the visual representation.

11. The method of claim 9, further comprising:
    storing the portion of the sporting event information on the portable electronic device.

12. The method of claim 9, further comprising:
    transmitting the portion of the sporting event information to a computing device.

13. The method of claim 9, further comprising:
    receiving an action prediction from a user on the portable electronic device, the action prediction associated with sporting event information;
    determining whether an action associated with the action prediction occurred in the sporting event based on the decoding of the portable electronic device auxiliary data.

14. The method of claim 13, further comprising:
    transmitting a result of an action predication determination to a computing device.

15. A non-transitory machine-readable medium comprising instructions, which when executed by one or more processors, cause the one or more processors to perform the following operations:
- optically receive a first portion of a visual representation of a video signal on a portable electronic device;
- decode on the portable electronic device the first portion to reproduce a first auxiliary data portion contained within the first portion, the first auxiliary data portion being modulated in an active portion of the first portion of the video signal, the active portion being included in the visual representation;
- determine whether the first auxiliary data matches at least a first portion of stored data on the portable electronic device to identify a first data match, the stored data being stored on the portable electronic device prior to the receiving of the first portion; and
- illuminate a first light-emitting device on the portable electronic device when the first data match was identified.

16. The medium of claim 15, comprising instructions to digitally decode on the portable electronic device.

17. The medium of claim 15, comprising instructions to optically receive the first portion from a display device, and wherein the first auxiliary data portion is at least substantially transparent within the visual representation.

18. The medium of claim 15, wherein the illuminate instruction is to provide a representation of a value available for redemption by use of the portable electronic device.

19. The medium of claim 15, wherein the value is an airline flight purchase.

20. The medium of claim 15, comprising instructions to digitally store the stored data in a memory of the portable electronic device.

21. The medium of claim 15, wherein the illuminate instruction is to illuminate a display.

22. The medium of claim 15, comprising instructions to receive radio transmissions.

23. The medium of claim 15, comprising instructions to interact with a computing device.

* * * * *